(12) United States Patent
Gao et al.

(10) Patent No.: US 9,357,571 B2
(45) Date of Patent: May 31, 2016

(54) LOCAL NETWORK AND METHOD FOR ESTABLISHING CONNECTION BETWEEN LOCAL GATEWAY AND HOME BASE STATION

(71) Applicant: HUAWEI DEVICE CO., LTD., Shenzhen (CN)

(72) Inventors: Chenliang Gao, Nanjing (CN); Hui Jin, Nanjing (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 101 days.

(21) Appl. No.: 14/104,528

(22) Filed: Dec. 12, 2013

(65) Prior Publication Data

US 2014/0105145 A1 Apr. 17, 2014

Related U.S. Application Data

(63) Continuation of application No. PCT/CN2012/077120, filed on Jun. 19, 2012.

(30) Foreign Application Priority Data

Jul. 5, 2011 (CN) .......................... 2011 1 0186696

(51) Int. Cl.
*H04W 76/02* (2009.01)
*H04W 84/04* (2009.01)
(Continued)

(52) U.S. Cl.
CPC .......... *H04W 76/022* (2013.01); *H04W 84/045* (2013.01); *H04L 61/2007* (2013.01); *H04W 88/16* (2013.01); *H04W 92/045* (2013.01)

(58) Field of Classification Search
CPC ............ H04W 36/00; H04W 36/0005; H04W 36/0011; H04W 36/60; H04W 76/00; H04W 76/02; H04W 76/021; H04W 76/022; H04W 76/025

See application file for complete search history.

(56) References Cited

U.S. PATENT DOCUMENTS

2012/0008554 A1* 1/2012 Kim et al. ..................... 370/328
2012/0063437 A1 3/2012 Liang et al.
(Continued)

FOREIGN PATENT DOCUMENTS

CN 101883352 11/2010
CN 101959175 1/2011
(Continued)

OTHER PUBLICATIONS

"3rd Generation Partnership Project; Technical Specification Group Services and System Aspects; LIPA Mobility and SIPTO at the Local Network; (Release 11)", 3GPP TR 23.859 V0.2.0, Apr. 2011, pp. 1-15.

(Continued)

*Primary Examiner* — Anh Ngoc Nguyen
(74) *Attorney, Agent, or Firm* — Staas & Halsey LLP

(57) ABSTRACT

The present invention discloses a local network and a method for establishing a connection between a local gateway and a home base station therein. As regards a newly proposed home base station network architecture 1, a mobility management network element receives L-GW information sent by the home base station, selects an L-GW which is located in the same local network as the home base station at least according to the received L-GW information and then informs the L-GW, through an S-GW, of establishing a PDN connection and a tunnel bearer with the home base station, thereby providing a local IP access for a UE. As regards a newly proposed home base station network architecture 2, no direct interface is arranged between the L-GW and the S-GW, the mobility management network element directly selects a corresponding L-GW for establishing a PDN connection for the UE.

22 Claims, 14 Drawing Sheets

(51) Int. Cl.
  *H04W 88/16* (2009.01)
  *H04W 92/04* (2009.01)
  *H04L 29/12* (2006.01)

(56) References Cited

U.S. PATENT DOCUMENTS

2012/0082090 A1* 4/2012 Horn et al. .................... 370/328
2012/0250601 A1* 10/2012 Choi et al. .................... 370/315
2013/0058292 A1 3/2013 Wang et al.

FOREIGN PATENT DOCUMENTS

| CN | 102088771 | 6/2011 |
| WO | 2010/123643 | 10/2010 |
| WO | 2010/127441 | 11/2010 |

OTHER PUBLICATIONS

PCT International Search Report and Written Opinion of the International Searching Authority dated Oct. 4, 2012 in corresponding International Patent Application No. PCT/CN2012/077120.

Extended European Search Report dated Jan. 4, 2016 in corresponding European Patent Application No. 12767337.4, 11 pages.

Panasonic, "Signalling of standalone LGW address for LIPA connection establishment", 3GPP TSG SA WG2 Meeting #83, TD S2-110681, Feb. 21-25, 2011, Salt Lake City, Utah, USA, pp. 1-4.

* cited by examiner

LOCAL NETWORK AND METHOD FOR ESTABLISHING CONNECTION BETWEEN LOCAL GATEWAY AND HOME BASE STATION

CROSS-REFERENCE TO RELATED APPLICATION

This application is a continuation of International Application No. PCT/CN2012/077120, filed on Jun. 19, 2012, which claims priority to Chinese Patent Application No. 201110186696.8, filed on Jul. 5, 2011, both of which are hereby incorporated by reference in their entireties.

TECHNICAL FIELD

The present invention relates to a communications technology, and in particular, to a local network and a method for establishing a connection between a local gateway and a home base station.

BACKGROUND

In December 2004, the 3GPP (3rd Generation Partnership Project, 3rd generation partnership project) started an all-IP packet domain core network evolution project (System Architecture Evolution, SAE), and now the project is renamed EPS (Evolved Packet System, evolved packet system). The EPS aims at "establishing a transplantable 3GPP system architecture with the characteristics of high data rate, short delay, data packetization, and supporting various types of wireless access technologies". The EPS system is classified into an E-UTRAN (Evolved Universal Terrestrial Radio Access Network, evolved universal terrestrial radio access network) and an EPC (Evolved Packet Core, evolved packet core).

FIG. 1 is a schematic diagram of an EPS system architecture in the prior art.

The E-UTRAN includes an eNB (E-UTRAN NodeB, E-UTRAN NodeB), which is mainly responsible for receiving and transmitting wireless signals and communicates with a terminal through an air interface.

The EPC includes an HSS (Home Subscriber Server, home subscriber server), an MME (Mobility Management Entity, mobility management entity), an S-GW (Serving Gateway, serving gateway), and a P-GW (Packet Data Networks Gateway, packet data networks gateway).

The HSS is a location for permanently storing subscriber subscription data, and is located in the home network to which a subscriber subscribes.

The MME is a location for storing subscriber subscription data in the current network and is responsible for NAS (Non-Access Stratum, non-access stratum) signaling management from a terminal to a network, and for achieving tracing and paging management functions when a UE is in an idle state.

The S-GW is a gateway from a core network to a wireless system and is responsible for the user plane bearer from a terminal to a core network, data buffering when a terminal is in an idle state, initiating a service request on the network side, lawful interception, and packet data routing and forwarding.

The P-GW is a gateway between the EPS and an external network of the system and is responsible for terminal functions such as IP address allocation, charging, packet filtration, and policy application.

As shown in FIG. 2, in the foregoing EPS architecture, when a UE requires a new P-GW for service transmission, a new PDN connection needs to be initiated, and the procedure is as follows:

Before the establishment of a new PDN in the EPS architecture, the following describes technical terms used in the procedure beforehand.

PDN: Packet Data Networks, packet data networks;
APN: Access Point Name, access point name;
initial attach: initial attach;
Bearer ID: bearer ID;
EPS Bearer: EPS bearer;
PCC: Policy and charging control, policy and charging control;
IP-CAN: IP-connectivity access network, IP-connectivity access network;
PCRF: Policy and Charging Rules Function, policy and charging rules function;
dedicated bearer: dedicated bearer;
PCEF: Policy and Charging Enforcement Function, policy and charging enforcement function;
QoS: Quality of Service (quality of service);
CGI: Cell Global Identification, cell global identification;
RAI: Routing Area Identity, routing area identity;
SAI: Serving Area Identity, serving area identity;
APN Restriction: APN restriction;
TEID: Tunnel Endpoint Identifier, tunnel endpoint identifier; and
RRC: Radio Resource Control, radio resource control.

The procedure for establishing a PDN connection in the EPS architecture is as follows:

1. A UE sends a PDN connectivity request (PDN Connectivity Request) message, where the message carries an APN, and an MME identifies whether the APN provided by the UE is allowed for use according to its stored subscriber subscription information.

2. If the Request Type of the PDN Connectivity Request message is "handover (handover)", the MME uses a P-GW in the stored subscriber subscription information to establish a PDN connection, and if the Request Type is "initial attach (initial attach)", the MME selects a P-GW according to a standard P-GW selection principle, allocates a Bearer ID to the UE, and sends a create session request message to the S-GW, where the create session request carries a P-GW address selected by the MME.

3. The S-GW establishes a new entry in its stored EPS Bearer list and at the same time sends a create session request (Create Session Request) message to the P-GW, where the P-GW is the P-GW corresponding to the P-GW address carried in the create session request message sent by the MME, which is described in step 2. Then the S-GW buffers a downlink packet from the P-GW until a data channel to an eNodeB is established.

4. If the Request Type of the PDN connectivity request is not "handover (handover)" and a dynamic PCC is deployed on the P-GW, the P-GW initiates an IP-CAN Session Establishment procedure to obtain default PCC rules through communication with a PCRF entity, which may lead to the establishment of a plurality of dedicated bearers. If the P-GW is configured to activate predefined PCC rules for a default beater, the P-GW does not need to communicate and interact with the PCRF. If a Handover instruction exists, the P-GW initiates a PCEF-Initiated IP-CAN Session Modification procedure. If no dynamic PCC is deployed on the P-GW, the P-GW activates a local QoS policy.

5. The P-GW establishes a new list entry in its EPS Bearer list and generates a Charging ID. The new list entry allows the P-GW to directly perform data forwarding in the PDN and the S-GW and start charging. The P-GW returns a create session response (Create Session Response) message to the S-GW, and the P-GW allocates an address to the UE. If the P-GW selects a different PDN Type for the UE, the P-GW needs to send a specific change cause value (network preference, single address bearers only) to the UE. For a request provided with a Handover instruction, the P-GW needs to allocate an IP address that is the same as that in non-3GPP access to the UE.

6. For an established bearer, if a CGI/SAI/RAI needs to be reported to the P-GW, the S-GW stores the reporting request and reports to the P-GW when the information changes, and the S-GW returns a create session response (Create Session Response) message to the MME.

7. If the MME receives an APN Restriction parameter, the MME stores the information and check whether a conflict exists according to Maximum APN Restriction. If the PDN Connectivity Request (PDN Connectivity Request) message is accepted, the MME sends a PDN Connectivity Accept (PDN Connectivity Accept) message to the eNodeB. The information is contained in a bearer setup request (Bearer Setup Request) message of an S1_MME control message. The S1_MME control message includes the address TEID of the user plane on the S-GW side.

8. The eNodeB sends an RRC connection reconfiguration (RRC Connection Reconfiguration) message to the UE, and the RRC connection reconfiguration message includes a PDN Connectivity Accept message.

9. The UE sends an RRC connection reconfiguration complete (RRC Connection Reconfiguration Complete) message to the eNodeB;

10. The eNodeB sends an S1-AP bearer setup response (Bearer Setup Response) message to the MME, where the message includes the address and TEID of the eNodeB used for establishing an S1-U.

11. The UE sends a Direct Transfer (direct transfer) message to the eNodeB to indicate that the PDN connection is established.

12. The eNodeB sends an Uplink NAS Transport (PDN Connectivity Complete) (uplink NAS transport PDN connectivity complete) message to the MME. When the UE receives the PDN connectivity accept (PDN Connectivity Accept) message and obtains a PDN address, the UE may send an uplink data packet. If the UE requires an address of IPv4v6 type but only obtains an address of IPv6 or IPv4 type, and the cause value is "single address bearers only", the UE may establish another PDN connection to the same APN and requires a single IP address, and the type of the required IP address is different from that of the obtained IP address. If the UE requires an IPv4v6 address but only obtains an IPv6 address prefix and an interface identifier, and no cause value is obtained, the UE may consider that the request for the address of a Dual Address PDN is successful.

13. After receiving the bearer setup response (Bearer Setup Response) and PDN connectivity complete (PDN Connectivity Complete) messages, the MME sends a modify bearer request (Modify Bearer Request) message to the S-GW.

13a: If the bearer setup response (Bearer Setup Response) and PDN connectivity complete (PDN Connectivity Complete) messages in step 13 contain a Handover instruction, the S-GW sends a modify bearer request (Modify Bearer Request) message to the P-GW, and the P-GW sends subsequent downlink packets to the S-GW.

13b: The P-GW sends a modify bearer response (Modify Bearer Response) message to the S-GW.

14: The S-GW sends the modify bearer response (Modify Bearer Response) to the MME, and the S-GW starts sending buffered downlink data packets.

15. After the MME receives the modify bearer response (Modify Bearer Response) message, if the Request Type is not "handover", the UE is allowed to be handed over to a non-3GPP network, and the UE selects a new PDN-GW when it is the first time the UE establishes a connection to a certain PDN (APN), the MME needs to update the address of the PDN-GW to an HSS.

16. The HSS stores a PDN-GW identity and a related APN and sends a notify response (Notify Response) to the MME.

The foregoing describes the process of establishing a new PDN in the EPS architecture.

With the technology development, the 3GPP proposes the concept of an H(e)NB (Home (e)NodeB, home base station) based on an NB (Node B, base station) and an eNB. The H(e)NB is mainly applied to family and enterprise environments to generally provide favorable charging or free services within the coverage of an H(e)N (Home Network, home network), for example, in an airport, a terminal may enjoy free network services, but the charge is higher if the terminal enters the coverage of a macro network in the moving process. The concept of CSG (Closed Subscriber Group, closed subscriber group) is proposed in the H(e)NB. The CSG marks a user group, and the user group is allowed to access a cell (CSG cell) which is restricted for access in one or more PLMNs (Public Land Mobile Network, public land mobile network). The CSG cell is a cell under a PLMN and broadcasts a specific CSG ID. Only members who belong to the CSG ID can access the cell, and all the CSG cells sharing the same ID work as an independent group, facilitating mobility management and charging.

The foregoing H(e)NB is mainly applied to family and enterprise environments. An LIPA service is included in the service demands of the H(e)NB. The LIPA service is defined as follows:

LIPA (Local IP Access, local IP access) refers to a UE with an IP capability accessing an entity with another IP capability in the same family/enterprise IP network in a wireless manner by using the H(e)NB. As shown in FIG. 3, the execution of service data in local IP access bypasses the core network of an operator.

FIG. 4 is a schematic diagram of a common architecture of a local home base station in the prior art.

In an L-GW (Local Gateway, local gateway) architecture, an UE establishes two PDN (Packet Data Networks, packet data networks) connections, where one PDN connection is used for core network services of an operator and the other PDN connection is used for LIPA services, and the LIPA PDN may have a specific APN (Access Point Name, access point name) identification. For establishing an independent PDN connection, an H(e)NB needs to be locally configured with a local gateway, and the local gateway may allocate an IP address to the UE for LIPA services to use. This architecture enables the UE which supports a plurality of PDN connections to use LIPA and the core network of a mobile operator at the same time. Therefore, the UE has a plurality of IP addresses. Mobility management signaling between the UE and the network, as well as UE authorization, authentication and registration performed before the establishment of the PDN connection for LIPA, is implemented in the core network of the mobile operator.

In a local home base station network (Local H(e)NB Network, LHN) shown in FIG. 4, a series of home base stations are defined, and meanwhile, these home (base stations establish IP connections to one or more L-GWs. These L-GWs may perform LIPA by using local PDN(s). Meanwhile, one H(e)NB only belongs to one independent local home base station network, one L-GW only belongs to one independent LHN, and one L-GW is capable of accessing one or more PDNs and is capable of accessing one PDN by using a plurality of LHNs. The local home base station network may also be referred to as a local network. Meanwhile, the local network may have a local network identity (LHN ID) or a local network name (LHN Name).

In the specific implementation process, the LHN has two novel network architectures. FIG. 5 shows a novel network architecture 1 of the local home base station, which includes network elements such as an L-GW, an HeNB, a UE, an SGW, and an MME, where the L-GW is a novel independent logical entity in the local network, and is connected to the S-GW through an S5 interface and at the same time connected to the home base station (Home eNodeB or Home NodeB) through a novel Sxx interface; the UE is connected to the HeNB through an interface Uu; the HeNB and the MME are connected through an interface S1-MME; and the SGW and the MME are connected through an S11. Optionally, the architecture also includes network elements of an SeGW and an HeNB GW, where the HeNB GW is connected to the SGW through an S1-U interface, and is connected to the MME through an S1 interface.

A novel architecture 2 of the local home base station network is as shown in FIG. 6, and the network architecture includes network elements such as an L-GW, an MME, an HeNB, a UE, an S-GW, and a P-GW. The L-GW serves as a novel independent logical entity in the local network, and is connected to the MME through an S11 interface and connected to the home base station through an Sxx interface. The address of the L-GW has two meanings: one is an L-GW core network address (L-GW CN Address), used for communicating with the core network, and the other is an L-GW local network address or an L-GW local address (L-GW LN Address), used for communicating with the home base station. Meanwhile, the HeNB also has two addresses: one is an HeNB core network address (HeNB CN Address), used for communicating with the core network, and the other is an HeNB local network address or an HeNB local address (HeNB LN Address), used for communicating with the L-GW through establishing a direct tunnel. The MME and the S-GW are connected through an S1-MME interface, and the S-GW and the P-GW are connected through an S5/8; and the UE and the HeNB are connected through a Uu interface, and the MME and the HeNB are connected through an S1-MME. Optionally, the architecture also includes network elements of an SeGW and an HeNBGW, where the HeNBGW is connected to the SGW through an S1-U interface, and is connected to the MME through an S1 interface.

During the implementation of the present invention, the inventors find that the prior art has at least the following problem:

In the architectures 1 and 2 of the local home base station network, the procedure for establishing a PDN connection in the prior art is inapplicable to the architectures 1 and 2, and is incapable of establishing local IP access and tunnel connection between the H(e)NB and the L-GW for the UE.

SUMMARY

Embodiments of the present invention provide the technology of establishing a connection between a local gateway and a home base station in newly proposed architectures 1 and 2 of the local home base station network, realize that LIPA service data is directly routed from an L-GW without passing by a core network, and solve the problem that in the prior art, a bearer between the base station and an S-GW and that between the S-GW and the L-GW need to be established, and bearer optimization is required accordingly.

Specifically, an embodiment of the present invention provides a method for establishing a connection between a local gateway and a home base station, where the local gateway L-GW is connected to a serving gateway S-GW, and the S-GW is connected to a mobility management network element. The method includes:

receiving, by the mobility management network element, L-GW information sent by the home base station, and selecting an L-GW which is located in the same local network as the home base station at least according to the received L-GW information, so as to establish a local IP access for a UE that initiates a packet data network PDN connectivity request;

sending, by the mobility management network element, a create session request to the selected L-GW through the S-GW, and receiving a create session response returned by the selected L-GW; and carrying, by the mobility management network element, a local address of the selected L-GW in a bearer setup request that is sent to the home base station, and establishing, by the home base station, a connection between the home base station and the L-GW by using the received local address of the L-GW.

An embodiment of the present invention further provides a method for establishing a connection between a local gateway and a home base station, where the local gateway L-GW is connected to a mobility management network element. The method includes:

receiving, by the mobility management network element L-GW information sent by the home base station, and selecting an L-GW which is located in the same local network as the home base station at least according to the received L-GW information, so as to establish a local IP access for a UE that initiates a packet data network PDN connectivity request;

sending, by the mobility management network element, a create session request to the L-GW selected by the mobility management network element, and receiving, by the mobility management network element, a create session response carrying the local address of the L-GW and returned by the selected L-GW; and carrying, by the mobility management network element, the local address of the L-GW in a bearer setup request that is sent to the home base station, for setting up a bearer between the mobility management network element and the home base station.

An embodiment of the present invention further provides a local network, including a local gateway L-GW, a home base station, a mobility management network element, and a serving gateway S-GW, where the L-GW is connected to the S-GW, the S-GW is connected to the mobility management network element, the L-GW is connected to the home base station, and the home base station is connected to the mobility management network element, where the mobility management network element is configured to receive L-GW information sent by the home base station, select an L-GW which is located in the same local network as the home base station at least according to the received L-GW information, so as to establish a local IP access for a UE that initiates a packet data network PDN connectivity request, and send a create session request to the selected L-GW through the S-GW;

the S-GW is configured to return a create session response to the mobility management network element;

the mobility management network element is further configured to carry the local address of the selected L-GW in a bearer setup request that is sent to the home base station; and the home base station is configured to establish a connection between the home base station and the L-GW by using the received local address of the L-GW.

Correspondingly, an embodiment of the present invention further provides a local network, including a local gateway L-GW, a home base station, and a mobility management network element, where the L-GW is connected to the mobility management network element, and the L-GW is connected to the home base station, where the home base station is configured to send L-GW information to the mobility management network element;

the mobility management network element is configured to receive L-GW information sent by the home base station, and select an L-GW which is located in the same local network as the home base station at least according to the received L-GW information, so as to establish a local IP access for a UE that initiates a packet data network PDN connectivity request;

the mobility management network element is further configured to send a create session request to the selected L-GW;

the selected L-GW is configured to send a create session response to the mobility management network element, where the create session response carries the local address of the L-GW; and the mobility management network element is further configured to: after receiving the create session response returned from the selected L-GW, carry the local address of the L-GW in a bearer setup request that is sent to the home base station, for setting up a bearer between the mobility management network element and the home base station.

Implementation of the present invention has the following beneficial effects:

As regards the newly proposed architecture 1 of the local home base station network, after a UE sends a PDN connectivity request to a home base station, a mobility management network element receives L-GW information sent by the home base station, selects an L-GW which is located in the same local network as the home base station, and then informs the L-GW through the S-GW of establishing a PDN connection and a bearer tunnel between the mobility management network element and the home base station, thereby providing a local IP access for the UE.

As regards the newly proposed architecture 2 of the local home base station network, an L-GW and an S-GW are not connected through a direct interface, after a UE sends a PDN connectivity request to the home base station, the mobility management network element needs to directly select a corresponding L-GW to establish a PDN connection for the UE so as to provide a local IP access for the UE. Therefore, the mobility management network element receives L-GW information sent by the home base station, selects an L-GW which is located in the same local network as the home base station and informs the L-GW of establishing a PDN connection and a bearer tunnel between the mobility management network element and the HeNB, thereby providing a local IP access for the UE.

Besides, no matter for the architecture 1 or the architecture 2 of the local home base station network, in the embodiments of the present invention, a tunnel connection between the home base station and the L-GW may be established for the UE, so that data is routed from the L-GW to the home base station rather than being transmitted indirectly through the core network of an operator.

BRIEF DESCRIPTION OF DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

Figure 1:
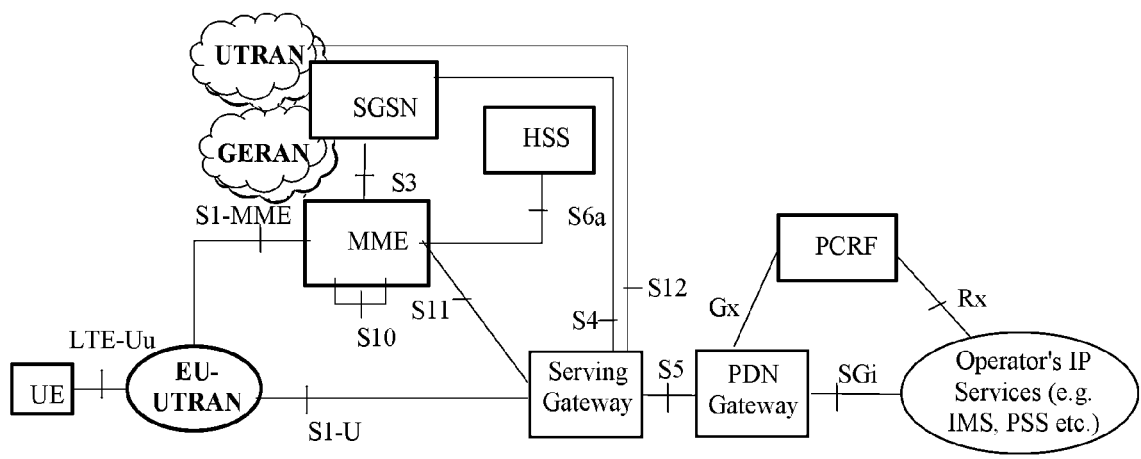
FIG. 1 is a schematic diagram of an EPS system architecture in the prior art.
Figure 2:
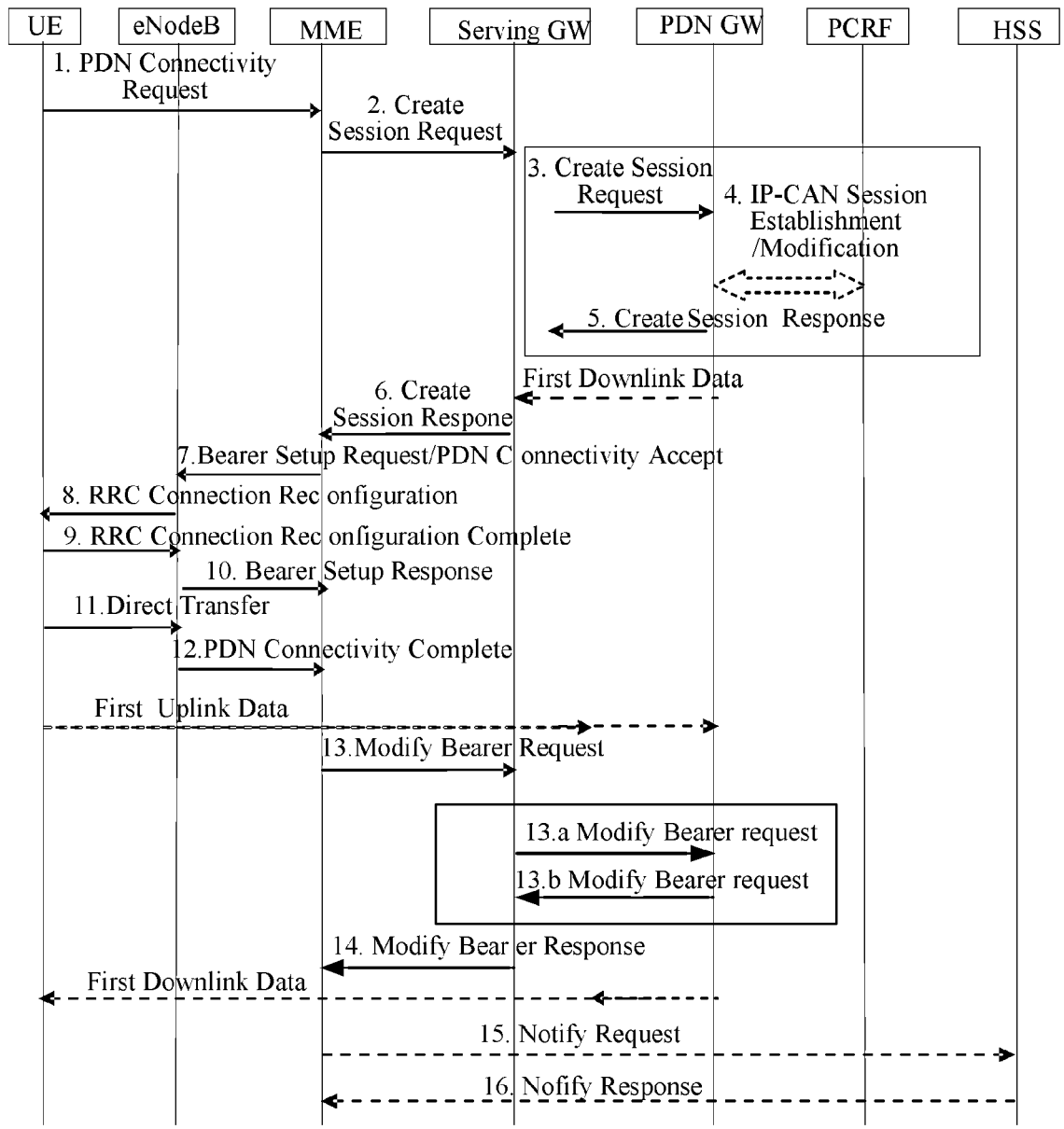
FIG. 2 is a schematic flowchart of a procedure of establishing a new PDN connection in an EPS system in the prior art.
Figure 3:
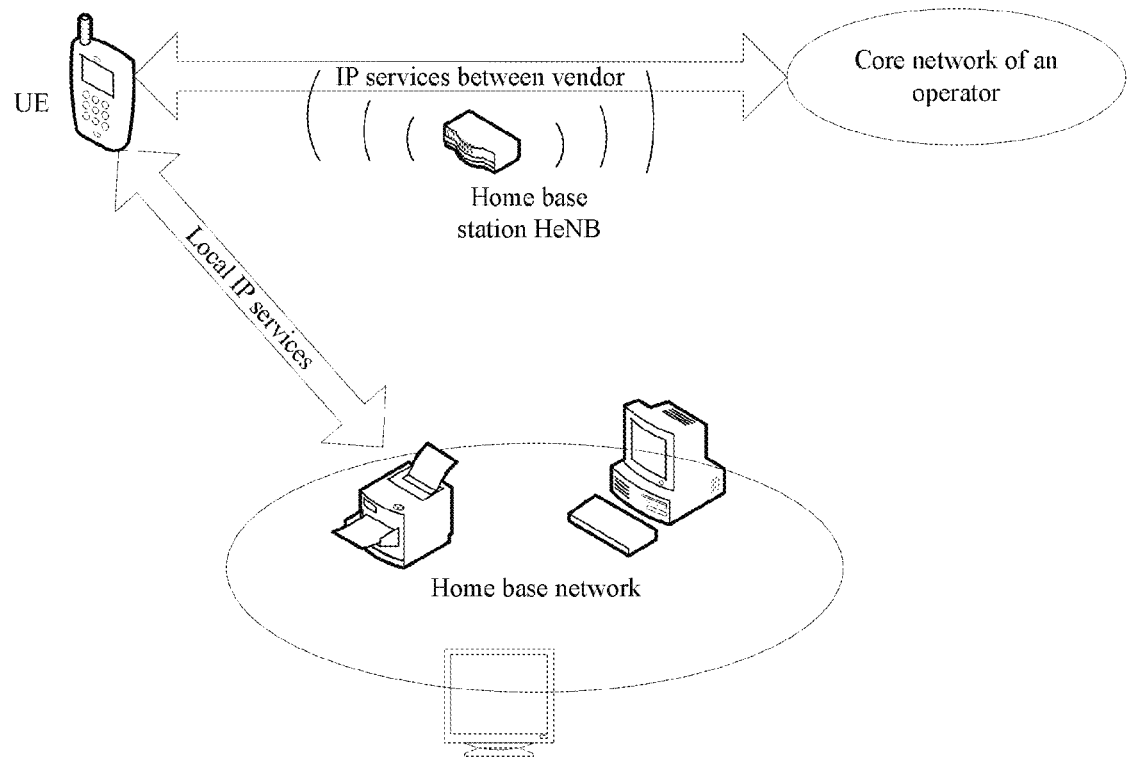
FIG. 3 is a schematic diagram of a local IP access network in the prior art.
Figure 4:
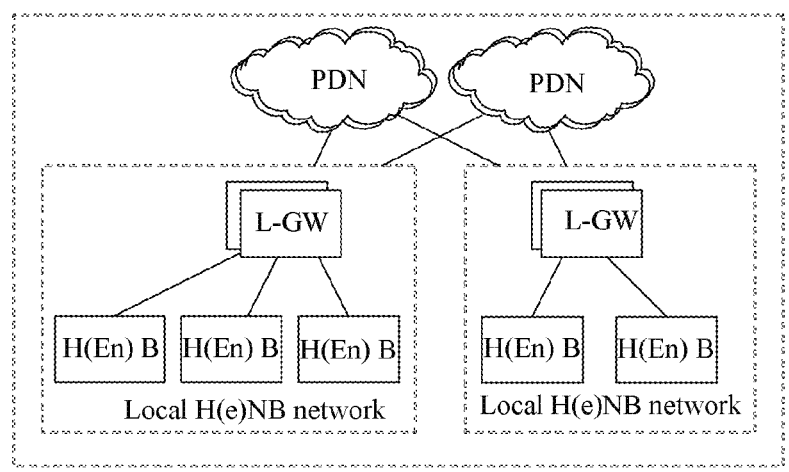
FIG. 4 is a schematic diagram of a common architecture of a home base station network in the prior art.

Embodiments of the present invention provide the technology of establishing a connection between a local gateway and a home base station in newly proposed architectures 1 and 2 of the local home base station network, realize that LIPA service data is directly routed from an L-GW without passing by a core network, and solve the problem that in the prior art, a bearer between the base station and an S-GW and that between the S-GW and the L-GW need to be established, and bearer optimization is required accordingly.

The core of the technology for establishing a connection between a local gateway and a home base station provided by the embodiments of the present invention is as follows:

As regards a newly proposed architecture 1 of a local home base station network, after a UE sends a PDN connectivity request to a home base station (may be an HeNB or an HNB in the embodiments of the present invention), a mobility management network element (may be an MME or an SGSN in the embodiments of the present invention), receives L-GW information sent by the home base station, selects an L-GW which is located in the same local network as the home base station at least according to the received L-GW information, and then informs the L-GW through the S-GW of establishing a PDN connection and a bearer tunnel between the mobility management network element and the home base station, thereby providing a local IP access for the UE.

As regards a newly proposed architecture 2 of the local home base station network, the L-GW and the S-GW are not connected through a direct interface. After the UE sends a PDN connectivity request to the home base station, the mobility management network element needs to directly select a corresponding L-GW to establish a PDN connection for the UE so as to provide a local IP access for the UE. Therefore, the mobility management network element receives L-GW information sent by the home base station, selects an L-GW which is located in the same local network as the home base station at least according to the received L-GW information, and informs the L-GW of establishing a PDN connection and a bearer tunnel between the mobility management network element and the home base station, thereby providing a local IP access for the UE.

It should be noted that in this application, the architecture 1 and the architecture 2 of the local home base station network are referred to as local network in a unified manner.

No manner in the architecture 1 or the architecture 2, the L-GW information of the mobility management network element comes from the home base station. There are three ways in which the home base station sends the L-GW information to the mobility management network element: the first one, the home base station carries its locally configured L-GW address or local network identity in an uplink non-access stratum NAS transport message or an S1 application protocol message that is sent to the mobility management network element; the second one, during the interface establishment procedure between the home base station and the mobility management network element, the home base station carries its locally configured L-GW address, or an L-GW address obtained during the interaction with the L-GW, or the L-GW address and an L-GW priority list in an interface establishment request message or a base station configuration update message to send to the mobility management network element; and the third one, the home base station carries a local network identity and/or a local network name in an uplink non-access stratum NAS transport message or an S1 application protocol message to send to the mobility management network element.

It should be noted that the uplink non-access stratum NAS transport message refers to a transmission message in the uplink direction from the home base station to the mobility management network element, where the uplink direction refers to the direction in which a terminal sends a request to the mobility management network element through a base station, and the non-access stratum includes a mobility management stratum and a connection management stratum. Correspondingly, the downlink direction refers to the direction in which the base station delivers data to the terminal.

The S1 application protocol message is a message sent from the home base station to the mobility management network element. The S1 application protocol is a signaling protocol and is described in 3GPP TS 36.413 and details are not described herein again.

Besides, no matter for the architecture 1 or the architecture 2 of the home base station network, in the embodiments of the present invention, a tunnel connection between the home base station and the L-GW may be established for the UE, so that data is routed from the L-GW to the home base station rather than being transmitted indirectly through the core network of an operator.

Figure 5:
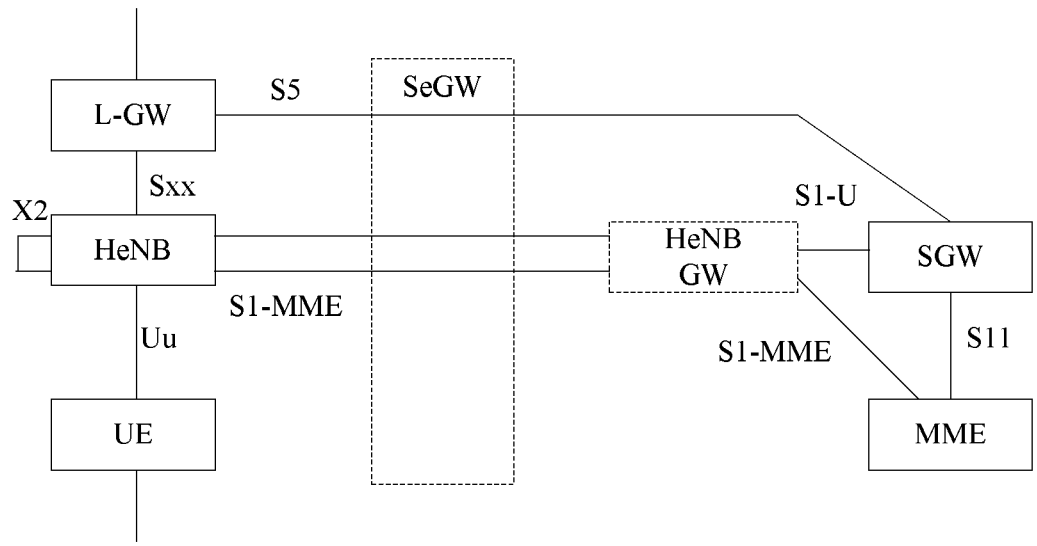
FIG. 5 is a schematic diagram of an architecture 1 of a home base station network.

Refer to FIG. 5, which is a schematic diagram of an architecture 1 of a local home base station network (local network).

It should be noted that Embodiment 1 of the local network according to the present invention is the same as the architecture 1 of the local home base station network provided by the prior art in the aspect of equipment constitution, except for the difference in the aspect of function and effect. Therefore the embodiment of the present invention is illustrated referring to the architecture 1 of the local home base station network shown in FIG. 5.

The local network provided by this embodiment includes a local gateway L-GW, a home base station (may be an HeNB or an HNB, and is an HeNB in the figure), a mobility management network element (may be an MME or an SGSN, and is an MME in the figure), and a serving gateway S-GW, where the L-GW is connected to the S-GW, the S-GW is connected to the mobility management network element, the L-GW is connected to the home base station, and the home base station is connected to the mobility management network element.

The mobility management network element is configured to receive L-GW information sent by the home base station, select an L-GW which is located in the same local network as the home base station at least according to the received L-GW information, so as to establish a local IP access for a UE that initiates a packet data network PDN connectivity request, and send a create session request to the selected L-GW through the S-GW.

The S-GW is configured to return a create session response to the mobility management network element.

The mobility management network element is further configured to carry the local address of the selected L-GW in a bearer setup request that is sent to the home base station.

The home base station is configured to establish a connection between the home base station and the L-GW by using the received local address of the L-GW.

Optionally, the local network provided by this embodiment may further include a terminal UE, an SeGW (Serving Evolved Gateway, serving evolved gateway), and an HeNB GW (Home (e) NodeB Gateway, home evolved base station gateway). The present invention does not involve functions and effects of the SeGW and the HeNB GW, so the description is omitted.

It should be noted that the interface between the L-GW and the HeNB is referred to as an Sxx interface, the interface between the HeNB and the S-GW is referred to as an S1-U interface, the interface between the HeNB and the MME is referred to as an S1-MME interface, the interface between the MME and the S-GW is referred to as an S11 interface, the interface between the S-GW and the L-GW is referred to as an S5 interface, and the interface between the UE and the HeNB is referred to as a Uu interface.

Figure 7:
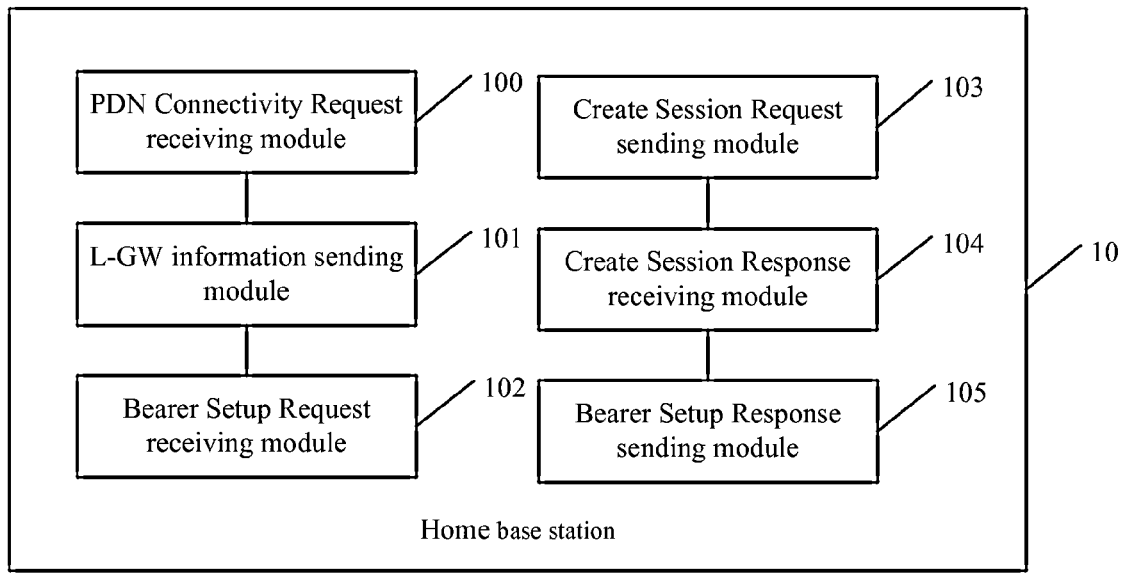
FIG. 7 is a schematic structural diagram of a home base station in a local network architecture 1 according to the present invention.

Refer to FIG. 7, which is a schematic structural diagram of a home base station in a local network architecture 1 according to the present invention.

The home base station provided by the embodiment of the present invention may be an HeNB or an HNB in the specific implementation process. The home base station 10 provided by this embodiment includes:

an L-GW information sending module 101, configured to carry its locally configured L-GW address or local network identity, or an L-GW address or a local network identity obtained during the interaction with the L-GW in an uplink non-access stratum NAS transport message or an S1 application protocol message to send to the mobility management network element; or carry its locally configured L-GW address, or an L-GW address obtained during the interaction with the L-GW, or the L-GW address and an L-GW priority list in an interface establishment request message or a base station configuration update message to send to the mobility management network element; or carry a plurality of local network identities and/or local network names in an uplink non-access stratum NAS transport message or an S1 application protocol message to send to the mobility management network element, where the L-GW address includes two meanings: one is an L-GW core network address (L-GW CN Address), used for communicating with the core network, and the other is an L-GW local network address or an L-GW local address (L-GW LN Address), used for communicating with the home base station;

a bearer setup request receiving module 102, configured to receive a bearer setup request sent by the mobility management network element to the home base station, where the bearer setup request carries an L-GW local address;

a create session request sending module 102, configured to send the create session request to the L-GW corresponding to the L-GW local address directly or through the mobility management network element, where the create session request carries the local address of the home base station and/or a tunnel endpoint identifier (TEID), and it should be noted that the home base station also has two addresses, one is an HeNB core network address (HeNB CN Address), used for communicating with the core network, and the other is an HeNB local network address or an HeNB local address (HeNB LN Address), used for communicating with the L-GW by establishing a direct tunnel;

a create session response receiving module 104, configured to receive a create session response returned by the L-GW directly or through the mobility management network element, where the create session response carries the L-GW local address and/or a tunnel endpoint identifier TEID; and a bearer setup response sending module 105, configured to send a bearer setup response to the mobility management network element.

Optionally, the home base station 10 further includes a PDN connectivity request receiving module 100, configured to receive the PDN connectivity request from the UE, where the PDN connectivity request at least carries an access point name APN of a local IP access allowed by subscriber subscription.

Figure 8:
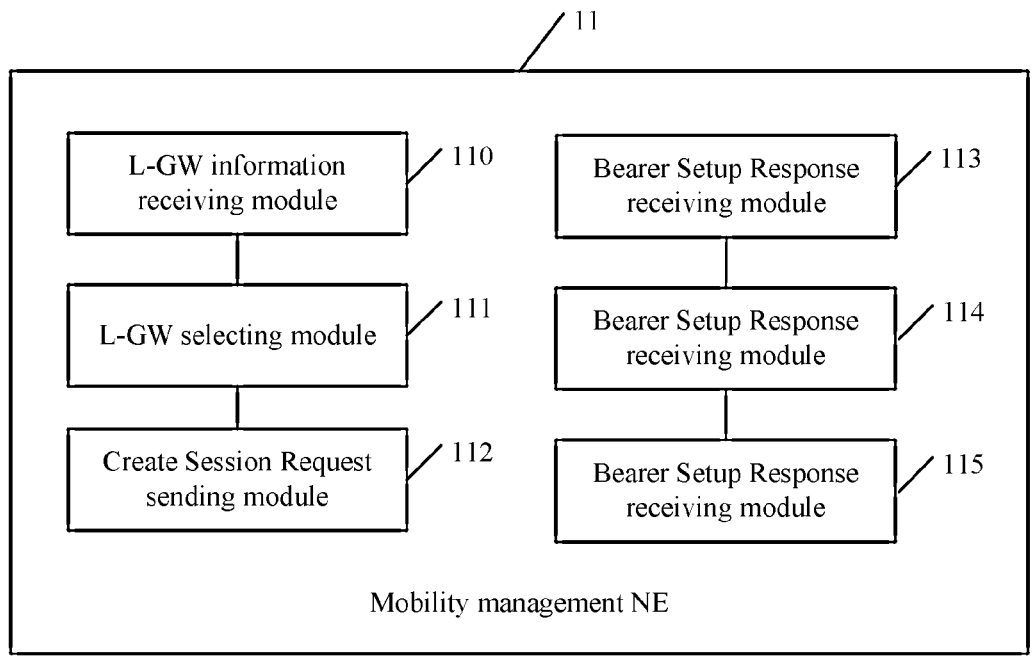
FIG. 8 is a schematic structural diagram of a mobility management network element in a local network architecture 1 according to the present invention.

Refer to FIG. 8, which is a schematic structural diagram of a mobility management network element in a local network architecture 1 according to the present invention.

The mobility management network element according to the embodiment of the present invention may be an MME or an SGSN, and specifically includes:

an L-GW information receiving module 110, configured to receive an uplink non-access stratum NAS transport message or an S1 application protocol message that is sent by an L-GW information sending module of the home base station and carries an L-GW address or a local network identity, or during the interface establishment procedure between the mobility management network element and the home base station, receive an interface establishment request or a base station configuration update message that is sent by the L-GW information sending module of the home base station and carries a locally configured L-GW address, or an L-GW address obtained during the interaction with the L-GW, or an L-GW address and an L-GW priority list, or receive an uplink non-access stratum NAS transport message or an S1 application protocol message that is sent by the L-GW information sending module of the home base station and carries a local network identity and/or a local network name;

an L-GW selecting module 111, configured to select an L-GW corresponding to the L-GW address or the local network identity at least according to the L-GW address or the local network identity carried in the interface establishment request message or the base station configuration update message received by the L-GW information receiving module 110 to establish a local IP access for a UE that initiates a packet data network PDN connectivity request, or select an L-GW which is located in the same local network as the home base station at least according to the L-GW address, or the L-GW address and the L-GW priority list carried in the interface establishment request message or the base station configuration update message received by the L-GW information receiving module 110 to establish a local IP access for a UE that initiates a packet data network PDN connectivity request, or after the L-GW information receiving module 110 receives the local network identity and/or the local network name carried in the uplink non-access stratum NAS transport message or the S1 application protocol message, select an L-GW which is located in the same local network as the home base station at least according to correspondence between the locally stored L-GW address and the local network identity and/or the local network name to establish a local IP access for a UE that initiates a packet data network PDN connectivity request;

a create session request sending module 112, configured to send a create session request to the S-GW, where the create session request carries the L-GW core network address of the selected L-GW and a local IP access instruction or a direct tunnel instruction, the L-GW core network address is used to instruct the tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

a create session response receiving module 113, configured to receive a create session response returned by the S-GW, where the create session response carries a QoS parameter for establishing the non-GBR tunnel or user plane information;

a bearer setup request sending module 114, configured to: after the create session response receiving module 113 receives the create session response returned by the S-GW, carry the local address of the L-GW in a bearer setup request that is sent to the home base station; and a bearer setup response receiving module 115, configured to receive a bearer setup response returned by the home base station.

Figure 9:
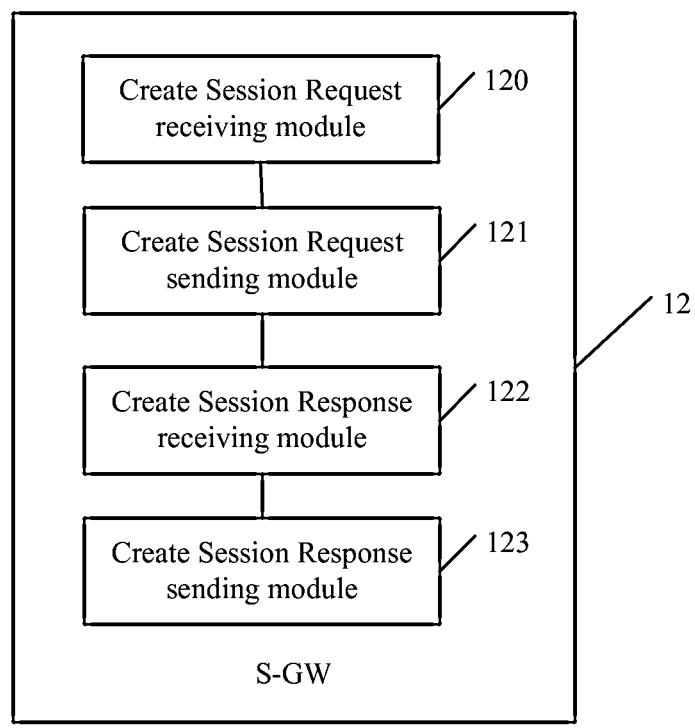
FIG. 9 is a schematic structural diagram of an S-GW in a local network architecture 1 according to the present invention.

Refer to FIG. 9, which is a schematic structural diagram of an S-GW in a local network architecture 1 according to the present invention.

An S-GW 12 according to the embodiment of the present invention includes:

a create session request receiving module 120, configured to receive a create session request sent by a mobility management network element, where the create session request carries an L-GW core network address of the selected L-GW and a local IP access instruction or a direct tunnel instruction, the L-GW core network address is used to instruct the tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

a create session request sending module 121, configured to send a create session request to the L-GW corresponding to the L-GW core network address, where the create session request carries an instruction for establishing the non-GBR tunnel;

a create session response receiving module 122, configured to receive a create session response returned by the L-GW, where the create session response carries a QoS parameter for establishing the non-GBR tunnel; and a create session response sending module 123, configured to send the create session response carrying the QoS parameter for establishing the non-GBR tunnel or only carrying control plane information to the mobility management network element.

Figure 10:
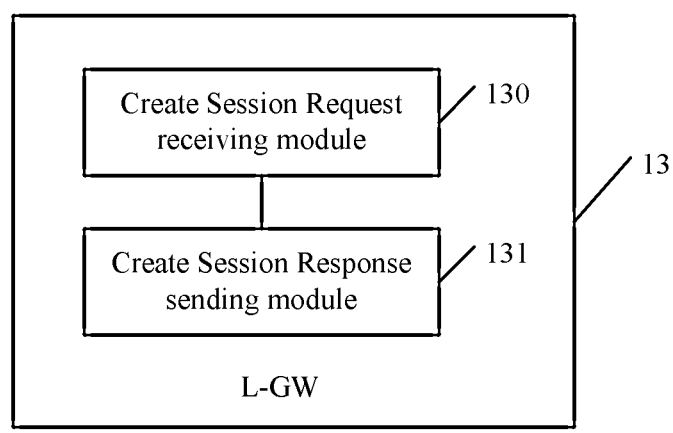
FIG. 10 is a schematic structural diagram of an L-GW in a local network architecture 1 according to the present invention.

Refer to FIG. 10, which is a schematic structural diagram of an L-GW in a local network architecture 1 according to the present invention.

An L-GW 13 according to the embodiment of the present invention includes:

a create session request receiving module 130, configured to receive a create session request sent by the create session request sending module of the S-GW, where the create session request carries an instruction for establishing a non-GBR tunnel; and a create session response sending module 131, configured to return a create session response to the S-GW, where the create session response carries a QoS parameter for establishing the non-GBR tunnel or only carries control plane information.

As regards the newly proposed architecture 1 of the local home base station network according to the foregoing embodiments, after a UE sends a PDN connectivity request to a home base station, a mobility management network element receives L-GW information sent by the home base station, selects an L-GW which is located in the same local network as the home base station, and then informs the L-GW through the S-GW of establishing a PDN connection and a bearer tunnel between the mobility management network element and the home base station, thereby providing a local IP access for the UE. Through the implementation of the embodiments of the present invention, a tunnel connection between the home base station and the L-GW may be established for the UE, so that data is routed from the L-GW to the home base station rather than being transmitted indirectly through the core network of an operator.

Figure 6:
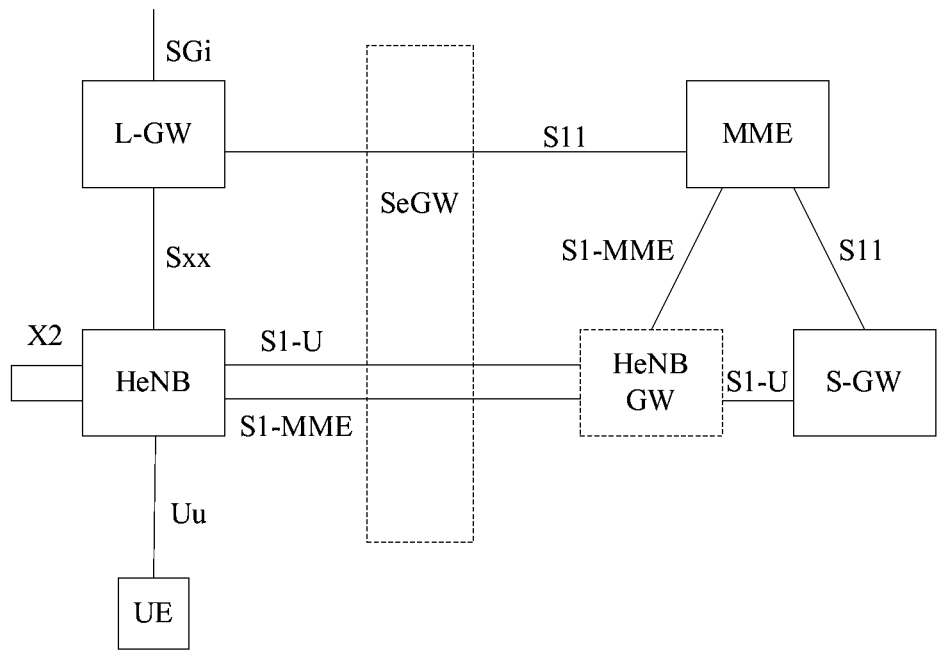
FIG. 6 is a schematic diagram of an architecture 2 of a home base station network.

Refer to FIG. 6, which is a schematic diagram of a local network architecture 2.

It should be noted that the network architecture 2 according to the present invention is the same as the architecture 2 of the local home base station network provided by the prior art in the aspect of equipment constitution, except for the difference in the aspect of function and effect. Therefore the embodiment of the present invention is illustrated referring to the architecture 1 of the local home base station network shown in FIG. 6.

The home base station network according to this embodiment includes a local gateway L-GW, a home base station (may be an HeNB or an HNB, and is an HeNB in the figure), and a mobility management network element (may be an MME or an SGSN, and is an MME in the figure), where the L-GW is connected to the mobility management network element, and the L-GW is connected to the home base station. It should be noted that in this embodiment, the establishment of a local IP access between the L-GW and the HeNB in the home base station network does not require the participation of an S-GW.

The home base station is configured to send L-GW information to the mobility management network element.

The mobility management network element is configured to receive L-GW information sent by the home base station, and select an L-GW which is located in the same local network as the home base station at least according to the received L-GW information, so as to establish a local IP access for a UE that initiates a packet data network PDN connectivity request.

The mobility management network element is further configured to send a create session request to the selected L-GW.

The selected L-GW is configured to send a create session response to the mobility management network element, where the create session response carries the local address of the L-GW.

The mobility management network element is further configured to: after receiving the create session response returned from the selected L-GW, carry the local address of the L-GW in a bearer setup request that is sent to the home base station, for setting up a bearer between the mobility management network element and the home base station.

Optionally, the home base station network according to this embodiment may further include a UE, an S-GW, an SeGW, and an HeNB GW. The present invention does not involve functions and effects of the SeGW and the HeNB GW, so the description is omitted.

It should be noted that the interface between the L-GW and the HeNB is referred to as an Sxx interface, the interface between the HeNB and the S-GW is referred to as an S1-U interface, the interface between the MME and the S-GW is referred to as an S11 interface, the interface between the MME and the L-GW is referred to as an S11 interface, and the interface between the UE and the HeNB is referred to as a Uu interface.

Figure 11:
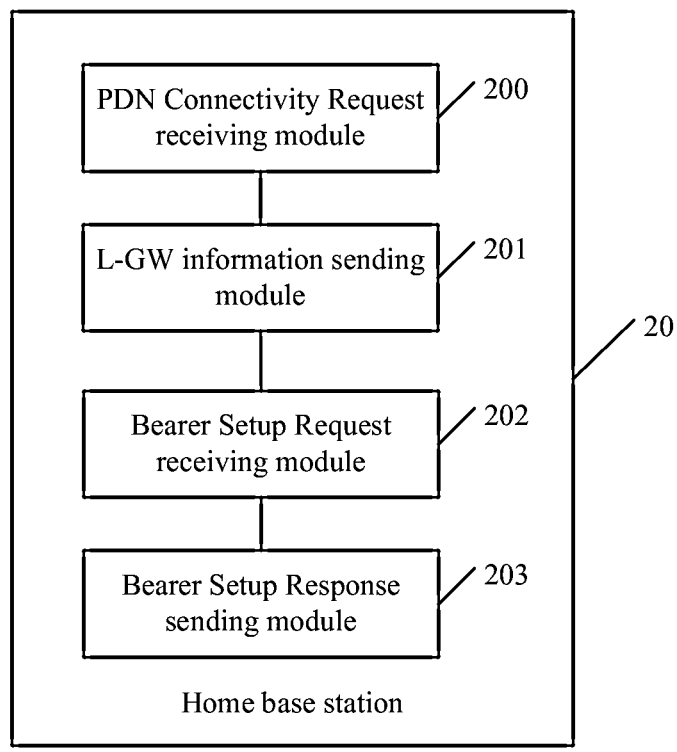
FIG. 11 is a schematic structural diagram of a home base station in a local network architecture 2 according to the present invention.

Refer to FIG. 11, which is a schematic structural diagram of a home base station in a local network architecture 2 according to the present invention.

A home base station according to the embodiment of the present invention may be an HNB or an HeNB, and includes:

an L-GW information sending module 201, configured to carry its locally configured L-GW address or local network identity, or an L-GW address or a local network identity obtained during the interaction with the L-GW in an uplink non-access stratum NAS transport message or an S1 application protocol message to send to the mobility management network element; or carry its locally configured L-GW address, or an L-GW address obtained during the interaction with the L-GW, or the L-GW address and an L-GW priority list in an interface establishment request message or a base station configuration update message to send to the mobility management network element; or carry a plurality of local network identities and/or local network names in an uplink non-access stratum NAS transport message or an S1 application protocol message to send to the mobility management network element;

a bearer setup request receiving module 202, configured to receive a bearer setup request sent by the mobility management network element to the home base station, where the bearer setup request carries an L-GW local address and a local IP access instruction; and a bearer setup response sending module 203, configured to send a bearer setup response to the mobility management network element, where the bearer setup response message carries the local address of the home base station and/or a tunnel endpoint identifier TEID.

Optionally, the home base station further includes:

a PDN connectivity request receiving module 200, configured to receive a PDN connectivity request sent by a UE, where the PDN connectivity request at least carries an access point name APN of a local IP access allowed by subscriber subscription.

Figure 12:
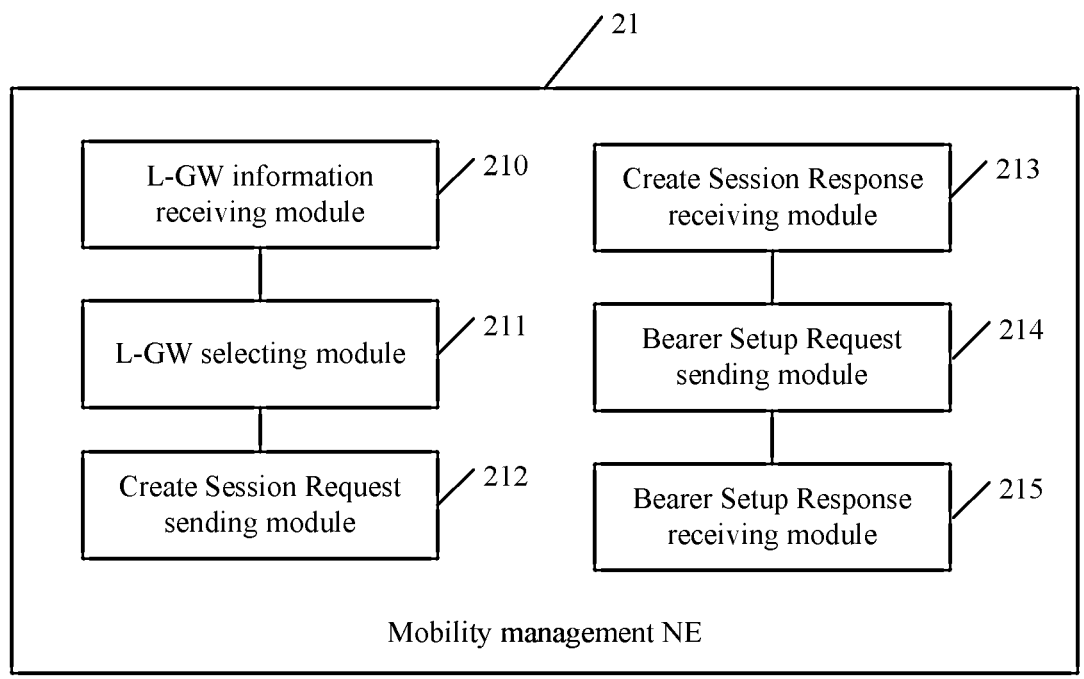
FIG. 12 is a schematic structural diagram of a mobility management network element in a local network architecture 2 according to the present invention.

Refer to FIG. 12, which is a schematic structural diagram of a mobility management network element in a local network architecture 2 according to the present invention.

The mobility management network element according to the embodiment of the present invention may be an MME or an SGSN, and includes:

an L-GW information receiving module 210, configured to receive an uplink non-access stratum NAS transport message or an S1 application protocol message that is sent by an L-GW information sending module of a home base station and carries an L-GW address or a local network identity, or during the interface establishment procedure between the mobility management network element and the home base station, receive an interface establishment request or a base station configuration update message that is sent by the L-GW information sending module of the home base station and carries a locally configured L-GW address, or an L-GW address obtained during the interaction with the L-GW, or an L-GW address and an L-GW priority list, or receive an uplink non-access stratum NAS transport message or an S1 application protocol message that is sent by the L-GW information sending module of the home base station and carries a local network identity and/or a local network name;

an L-GW selecting module 211, configured to select an L-GW corresponding to the L-GW address or the local network identity at least according to the L-GW address or the local network identity carried in the uplink non-access stratum NAS transport message received by the L-GW information receiving module 210 to establish a local IP access for a UE that initiates a packet data network PDN connectivity request, or select an L-GW which is located in the same local network as the home base station at least according to the L-GW address, or the L-GW address and the L-GW priority list carried in an interface establishment request message or a base station configuration update message received by the L-GW information receiving module 210 to establish a local IP access for s UE that initiates a packet data network PDN connectivity request, or after the L-GW information receiving module 210 receives the local network identity and/or the local network name carried in the uplink non-access stratum NAS transport message or the S1 application protocol message, select an L-GW which is located in the same local network as the home base station at least according to correspondence between the locally stored L-GW address and the local network identity and/or the local network name to establish a local IP access for a UE that initiates a packet data network PDN connectivity request;

a create session request sending module 212, configured to send a create session request to the L-GW selected by the L-GW selecting module;

a create session response receiving module 213, configured to receive a create session response returned by the selected L-GW, where the create session response carries the local address of the L-GW and/or a tunnel endpoint identifier TEID;

a bearer setup request sending module 214, configured to send a bearer setup request to the home base station after the create session response receiving module receives the create session response returned by the selected L-GW, where the bearer setup request carries the local address of the L-GW and a local IP access instruction; and a bearer setup response receiving module 215, configured to receive a bearer setup response returned by the home base station, where the bearer setup response carries the local address of the home base station and/or a tunnel endpoint identifier TEID.

Figure 13:
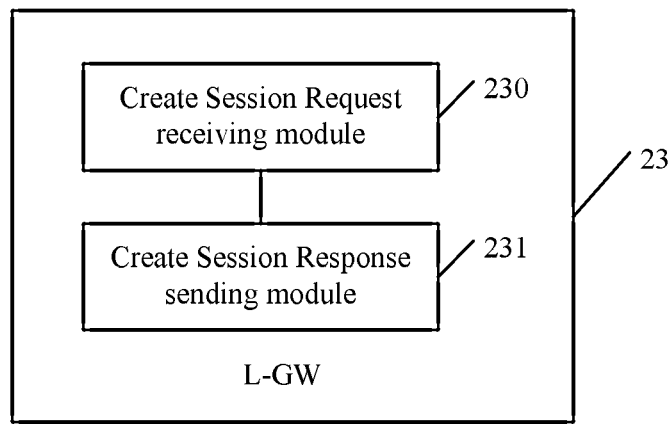
FIG. 13 is a schematic structural diagram of an L-GW in a local network architecture 2 according to the present invention.

Refer to FIG. 13, which is a schematic structural diagram of an L-GW in a local network architecture 2 according to the present invention.

An L-GW 22 according to the embodiment of the present invention includes:

a create session request receiving module 220, configured to receive a create session request sent by a create session request sending module of a mobility management network element; and a create session response sending module 221, configured to return a create session response to the mobility management network element, where the create session response carries the local address of the L-GW and/or a TEID.

As regards the newly proposed architecture 2 of the local home base station network according to the foregoing embodiments, an L-GW and an S-GW are not connected through a direct interface, after a UE sends a PDN connectivity request to a home base station, a mobility management network element needs to directly select a corresponding L-GW to establish a PDN connection for the UE so as to provide a local IP access for the UE. Therefore, the mobility management network element receives L-GW information sent by the home base station, selects an L-GW which is located in the same local network as the home base station, and informs the L-GW of establishing a PDN connection and a bearer tunnel between the mobility management network element and the home base station, thereby providing a local IP access for the UE. In the embodiment of the present invention, a tunnel connection between the home base station and the L-GW may further be established for the UE, so that data is routed from the L-GW to the home base station rather than being transmitted indirectly through the core network of an operator.

The following describes the procedure of a method for establishing a local IP access between a local gateway and a home base station in a home base station network.

Figure 14:
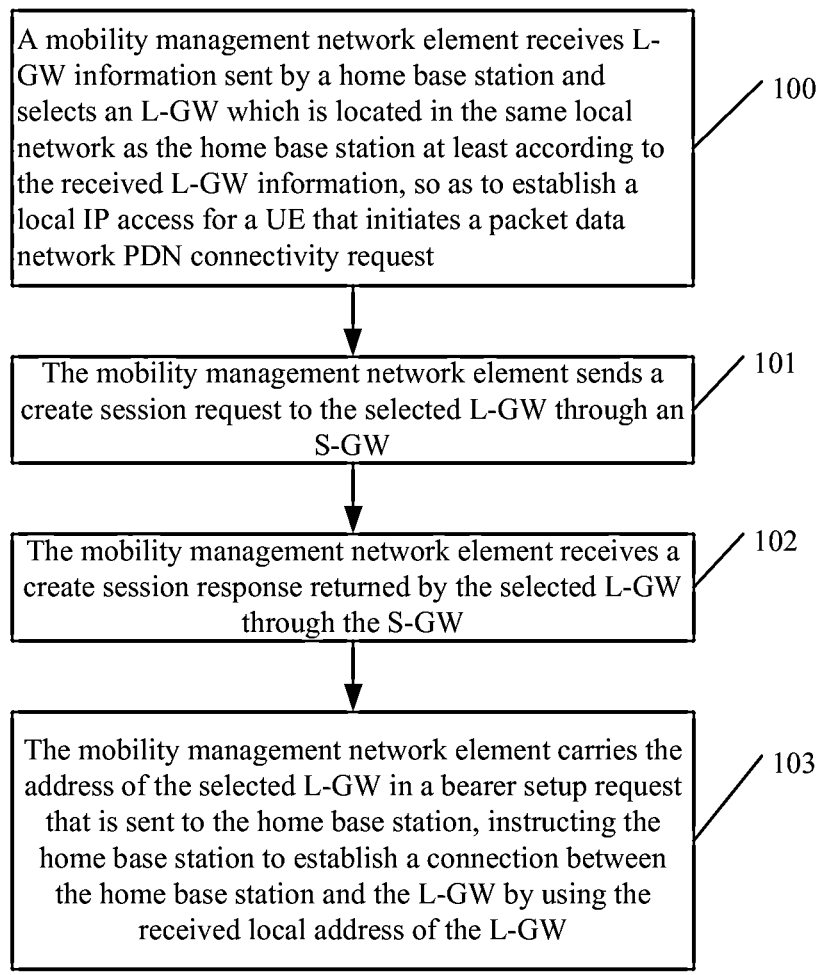
FIG. 14 is a schematic flowchart of Embodiment 1 of a method for establishing a connection between a local gateway and a home base station as shown in FIG. 5 according to the present invention.

Refer to FIG. 14, which is a flowchart of Embodiment 1 of a method for establishing a connection between a local gateway and a home base station in a local network as shown in FIG. 5 according to the present invention.

The embodiment of the present invention provides a method for establishing a local IP access between a local gateway and a home base station, where the local gateway L-GW is connected to a serving gateway S-GW, and the S-GW is connected to a mobility management network element. The method includes:

Step 100: A mobility management network element receives L-GW information sent by a home base station and selects an L-GW which is located in the same local network as the home base station at least according to the received L-GW information, so as to establish a local IP access for a UE that initiates a packet data network PDN connectivity request.

Step 101: The mobility management network element sends a create session request to the selected L-GW through an S-GW.

Step 102: The mobility management network element receives a create session response returned by the selected L-GW through the S-GW.

Step 103: The mobility management network element carries the address of the selected L-GW in a bearer setup request that is sent to the home base station, instructing the home base station to establish a connection between the home base station and the L-GW by using the received local address of the L-GW.

It should be noted that the foregoing step 100: a mobility management network element receives L-GW information sent by a home base station and selects an L-GW which is located in the same local network as the home base station at least according to the received L-GW information, so as to establish a local IP access for a UE that initiates a packet data network PDN connectivity request, has three implementation manners in the specific implementation.

The first manner: the home base station carries its locally configured L-GW address or local network identity, or an L-GW address or a local network identity obtained during the interaction with the L-GW in an uplink non-access stratum NAS transport message or an S1 application protocol message to send to the mobility management network element, where the L-GW address is an L-GW local address and/or an L-GW core network address; and the mobility management unit selects an L-GW which is located in the same local network as the home base station and corresponds to the L-GW address or the local network identity at least according to the uplink non-access stratum NAS transport message or the S1 application protocol message that is sent by the home base station, so as to establish a local IP access for the UE that initiates a packet data network PDN connectivity request.

The second manner: during the interface establishment procedure between the home base station and the mobility management network element, the home base station carries its locally configured L-GW address, or an L-GW address obtained during the interaction with the L-GW, or the L-GW address and an L-GW priority list in an interface establishment request message or a base station configuration update message to send to the mobility management network element, where the L-GW address is an L-GW local address and/or an L-GW core network address; and after the home base station receives a PDN connectivity request from a UE and forwards the request to the mobility management network element, the mobility management network element selects an L-GW which is located in the same local network as the home base station at least according to the L-GW address or the L-GW address and the L-GW priority list carried in the received interface establishment request message or base station configuration update message to establish a local IP access for the UE that initiates a packet data network PDN connectivity request.

The third manner: the home base station sends a local network identity and/or a local network name, which is carried in the uplink non-access stratum NAS transport message or the S1 application protocol message, to the mobility management network element; and after receiving the uplink non-access stratum NAS transport message or the S1 application protocol message which carries the local network identity (LHN ID, Local H(e)NB Network ID) and/or the local network name, the mobility management network element selects an L-GW which is located in the same local network as the home base station at least according to correspondence between the locally stored L-GW address and the local network identity and/or the local network name to establish a local IP access for the UE that initiates a packet data network PDN connectivity request.

The foregoing steps 101 and 102: the mobility management network element sends a create session request to the selected L-GW through an S-GW and receives a create session response returned by the selected L-GW, have two implementation manners in the specific implementation.

The first manner: the mobility management network element sends a create session request to the S-GW, where the create session request carries the L-GW core network address of the selected L-GW and a local IP access instruction or a direct tunnel instruction, the L-GW core network address is used to instruct the tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

the S-GW sends a create session request to the L-GW corresponding to the L-GW core network address, where the create session request carries an instruction for establishing a non-GBR tunnel; and the L-GW returns a create session response to the mobility management network element through the S-GW, where the create session response carries a QoS parameter for establishing a non-GBR tunnel.

The second manner: the mobility management network element sends a create session request to the S-GW, where the create session request carries the L-GW core network address of the selected L-GW and a local IP access instruction or a direct tunnel instruction, the L-GW core network address is used to instruct the tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

the S-GW sends a create session request to the L-GW corresponding to the L-GW core network address, where the create session request carries a local IP access instruction and a QoS parameter for establishing a non-GBR tunnel and only carries control plane information;

the L-GW returns a create session response to the S-GW, where the create session response carries the QoS parameter for establishing a non-GBR tunnel; and the S-GW returns a create session response to the mobility management network element, where the create session response only carries control plane information.

The foregoing step 103: the mobility management network element carries the address of the selected L-GW in a bearer setup request that is sent to the home base station, instructing the home base station to establish a connection between the home base station and the L-GW by using the received local address of the L-GW, also has two manners in the specific implementation process, specifically described as follows:

The first manner: after receiving a bearer setup request from the mobility management network element, the home base station sends a create session request to the L-GW corresponding to the L-GW local address, where the create session request carries the local address of the home base station and/or a tunnel endpoint identifier TEID; and the home base station receives a create session response from the L-GW, where the create session response carries the L-GW local address and/or a tunnel endpoint identifier TEID.

The second manner: after receiving the bearer setup request from the mobility management network element, the home base station returns the local address of the home base station and/or the local address of the home base station and the TEID to the mobility management network element;

after receiving the local address of the home base station and/or the TEID of the home base station, which is returned by the home base station, the mobility management network element sends the local address of the home base station and the TEID of the home base station to the selected L-GW; and the home base station receives a create session response from the L-GW, where the create session response carries the L-GW local address and/or a tunnel endpoint identifier TEID.

The following embodiments describe the implementation procedures of the present invention in detail.

Figure 15:
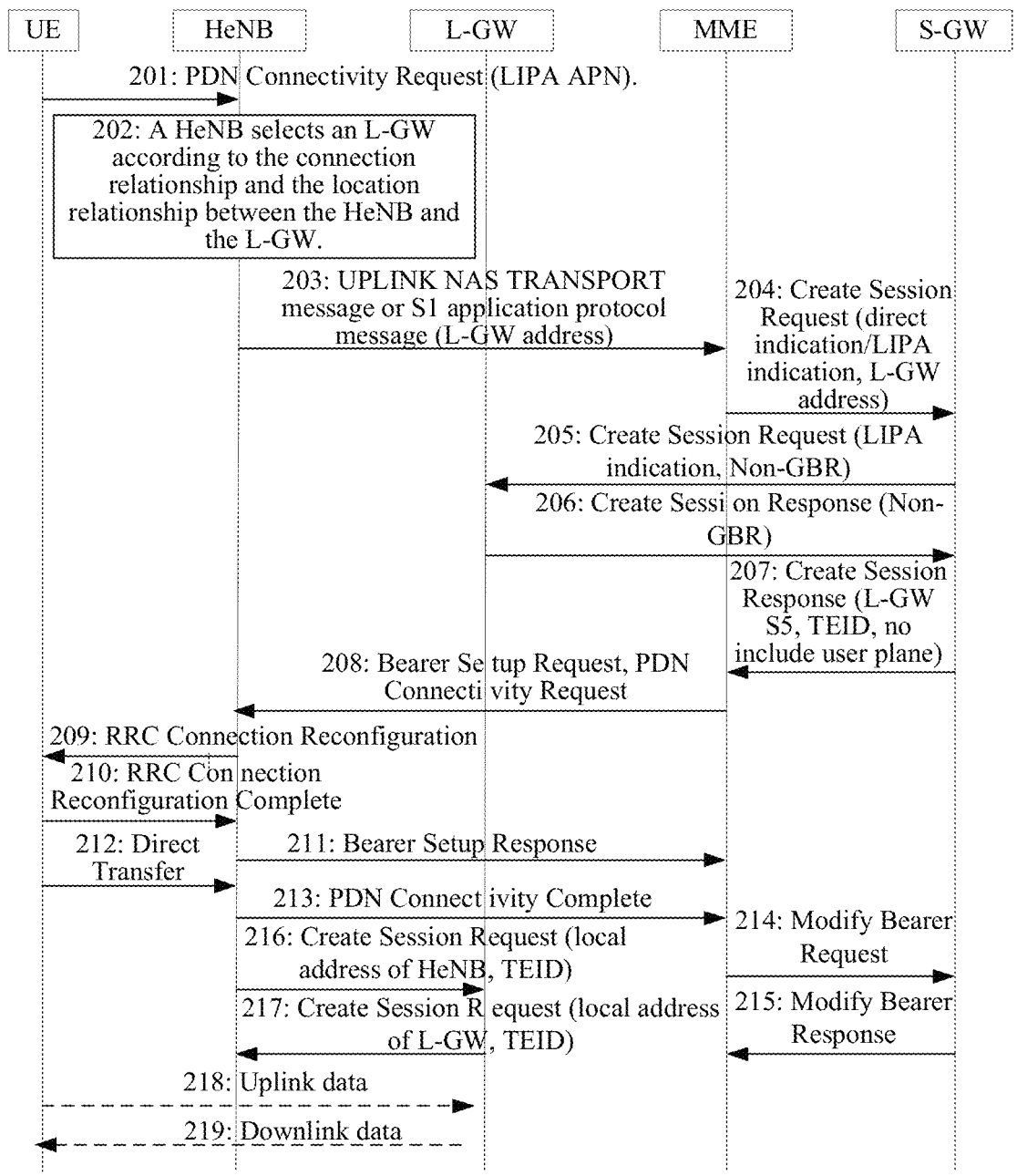
FIG. 15 is a schematic flowchart of Embodiment 2 of a method for establishing a connection between a local gateway and a home base station as shown in FIG. 5 according to the present invention.

FIG. 15 shows a schematic flowchart of Embodiment 2 of a method for establishing a connection between a local gateway and a home base station in a local network as shown in FIG. 5 according to the present invention.

In the method according to this embodiment, a home base station is specifically an HeNB and a mobility management network element is specifically an MME. The method includes:

Step 201: A UE sends a PDN connectivity request message to the HeNB, where the message carries an LIPA APN, indicating that an LIPA bearer needs to be established.

Step 202: After receiving the PDN connectivity request message sent by the UE, the HeNB selects an L-GW address or a local network identity at least according to the connection relationship between the HeNB and the L-GW and/or the position and/or the local configuration.

Step 203: The HeNB carries the selected L-GW address or local network identity in an uplink non-access stratum NAS transport message or an S1 application protocol message that is sent to the MME, where the L-GW address includes an L-GW local address and/or a core network address.

Step 204: After receiving the uplink non-access stratum NAS transport message or the S1 application protocol message, the MME sends a create session request message to an S-GW, where the create session request message carries an LIPA instruction or a direct tunnel instruction, instructing MME that a direct tunnel needs to be established, and meanwhile, carries the L-GW core network address to the S-GW, instructing the S-GW that the L-GW setup session needs to be established, where the carried bearer QoS is a Non-GBR.

Step 205: The S-GW sends a create session request to the L-GW, where the create session request carries an LIPA instruction and does not carry user plane information.

Step 206: The L-GW returns a create session response to the S-GW, where the carried bearer QoS parameter indicate that the bearer is a Non-GBR.

Step 207: The S-GW sends a create session response message to the MME, where the create session response message does not carry user plane information, that is, an S1-MME bearer is not established.

Step 208: The MME sends a bearer setup request to the HeNB, where the bearer setup request carries the L-GW local address, and a base station establishes a connection with the L-GW in subsequent steps.

Steps 209 to 213: Establish a bearer between the UE and the radio network using the MME, the L-GW, and the HeNB, which is common knowledge for a person skilled in the art, and is not described herein again.

Step 214: The S-GW sends a modify bearer request to the L-GW when the bearer needs to be modified.

Step 215: The L-GW sends a modify bearer response to the S-GW.

Step 216: The HeNB sends a create session request to the L-GW, where the create session request carries the local address of the HeNB and the TEID.

Step 217: The L-GW sends a create session response to the HeNB, where the create session response carries the L-GW local address and the TEID.

Step 218: The UE sends uplink data to the HeNB.

Step 219: The HeNB sends downlink data to the UE.

In this embodiment, after the HeNB receives the PDN connectivity request sent by the UE to the HeNB, the HeNB sends the local address of the L-GW or the local network identity to the MME at least according to locally configured L-GW information or stored L-GW priority list, and the MME establishes a session with the L-GW through the S-GW and establishes a bearer between the L-GW and the HeNB. This embodiment further introduces a radio bearer establishing procedure and a bearer modifying procedure.

Figure 16:
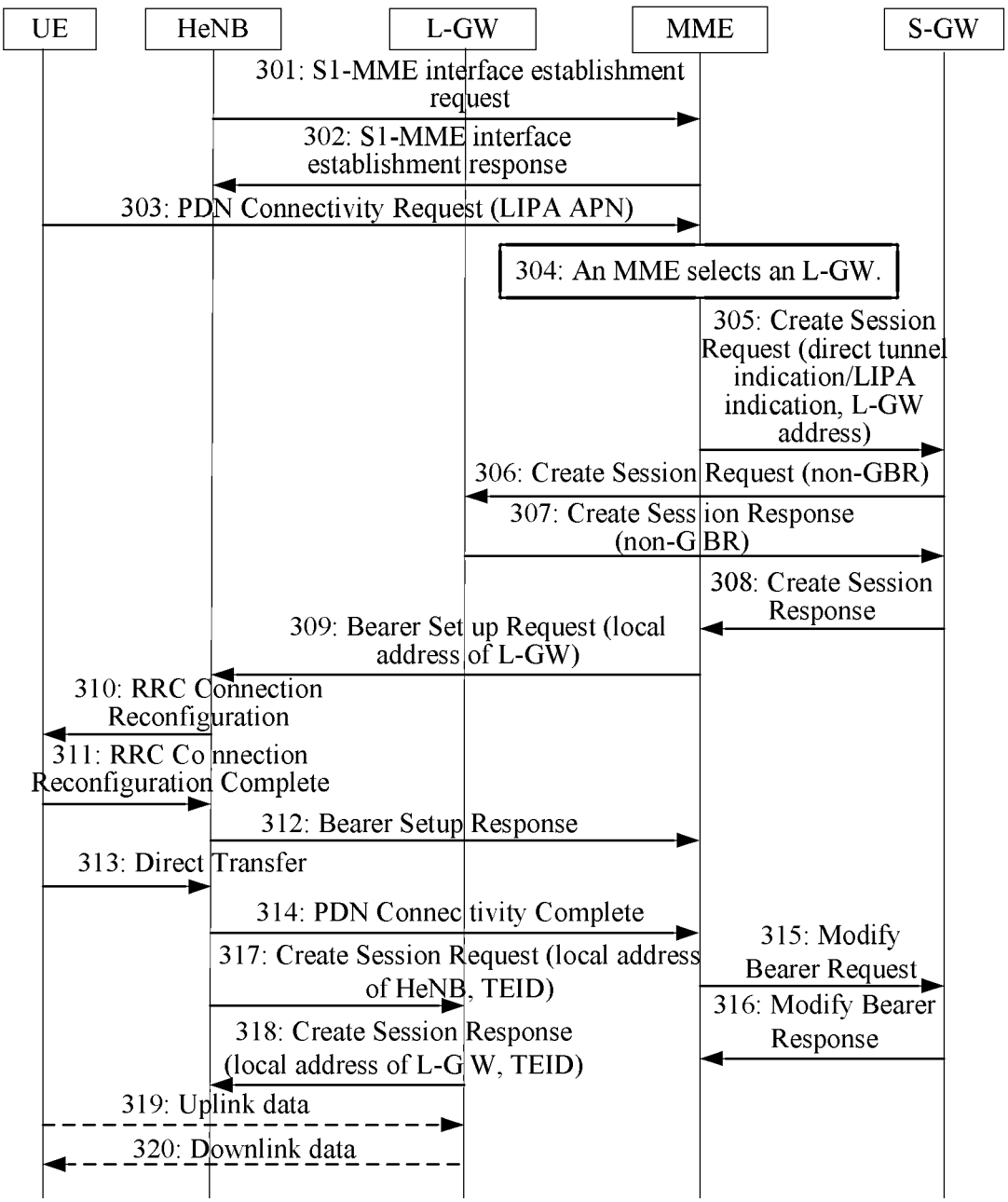
FIG. 16 is a schematic flowchart of Embodiment 3 of a method for establishing a connection between a local gateway and a home base station as shown in FIG. 5 according to the present invention.

FIG. 16 shows a schematic flowchart of Embodiment 3 of a method for establishing a connection between a local gateway and a home base station in a local network as shown in FIG. 5 according to the present invention.

In the method according to this embodiment, a home base station is specifically an HeNB and a mobility management network element is specifically an MME. The method includes:

Step 301: During an S1-MME interface establishment procedure between an HeNB and an MME, the HeNB sends an S1-MME setup request (S1 Setup Request) message to the MME, where the message carries an L-GW address or further carries an L-GW priority list, and the L-GW priority list may be configured by a local network at least according to the position relationship between the L-GW and the HeNB or the load situation of the L-GW. The L-GW address is an L-GW local address and/or an L-GW core network address.

It should be noted that the HeNB may further send the L-GW address or the L-GW address and the L-GW priority list to the MME by using a base station configuration update message.

Step 302: After receiving the L-GW address or the L-GW address and the L-GW priority list, the MME records the L-GW address or the L-GW address and the L-GW priority list taking the HeNB ID as the index, records the address and priority list of the L-GW connected to the HeNB, and returns an S1-MME setup response (S1-MME Setup Response) message to the HeNB.

Step 303: The UE sends a PDN connectivity message to the HeNB, where the message carries an APN and the APN is at least an APN of an LIPA service allowed by subscriber subscription.

Step 304: After receiving the PDN connectivity request sent by the UE, the MME selects, based on the recorded L-GW address and L-GW priority list information and the current load situation of the L-GW, an L-GW for establishing a PDN connection for the UE.

Step 305: The MME sends a create session request (Create Session Request) to the S-GW, where the message carries an L-GW core network address, used to instruct the S-GW to perform tunnel establishment, and meanwhile, carries an LIPA instruction or a direct tunnel instruction, used to indicate that the tunnel is a non-GBR tunnel.

Step 306: The L-GW returns a create session request to the S-GW, where the carried bearer QoS parameter indicates that the bearer is a Non-GBR.

Step 307: The S-GW returns a create session response message to the MME, where the carried bearer QoS parameter indicates that the bearer is a Non-GBR QoS parameter;

Step 308: The S-GW returns a create session response to the MME.

Step 309: The MME sends a bearer setup request to the HeNB, where the bearer setup request carries the L-GW local address, and a base station establishes a connection with the L-GW in subsequent steps.

Steps 310 to 314: Establish a bearer between the UE and the radio network using the MME, the L-GW, and the HeNB, which is common knowledge for a person skilled in the art, and is not described herein again.

Step 315: The S-GW sends a modify bearer request to the L-GW when the bearer needs to be modified.

Step 316: The L-GW sends a modify bearer response to the S-GW.

Step 317: The HeNB sends a create session request (Create session request) to the L-GW, where the create session request carries the local address of the HeNB and/or the TEID;

Step 318: The L-GW sends a create session response (Create session response) to the HeNB, where the create session response carries the L-GW local address and/or the TEID.

Step 319: The UE sends uplink data to the HeNB.

Step 320: The HeNB sends downlink data to the UE.

As regards the newly proposed architecture 1 of a home base station network according to the foregoing embodiments, after a UE sends a PDN connectivity request to a home base station, an MME receives L-GW related information from an HeNB, selects an L-GW, and then informs the L-GW through the S-GW of establishing a PDN connection and a bearer tunnel between the L-GW and the HeNB, thereby providing a local IP access for the UE. The embodiment of the present invention may further establish a tunnel connection between the HeNB and the L-GW for the UE, so that data is routed from the L-GW to the HeNB rather than being transmitted indirectly through the core network of an operator.

Figure 17:
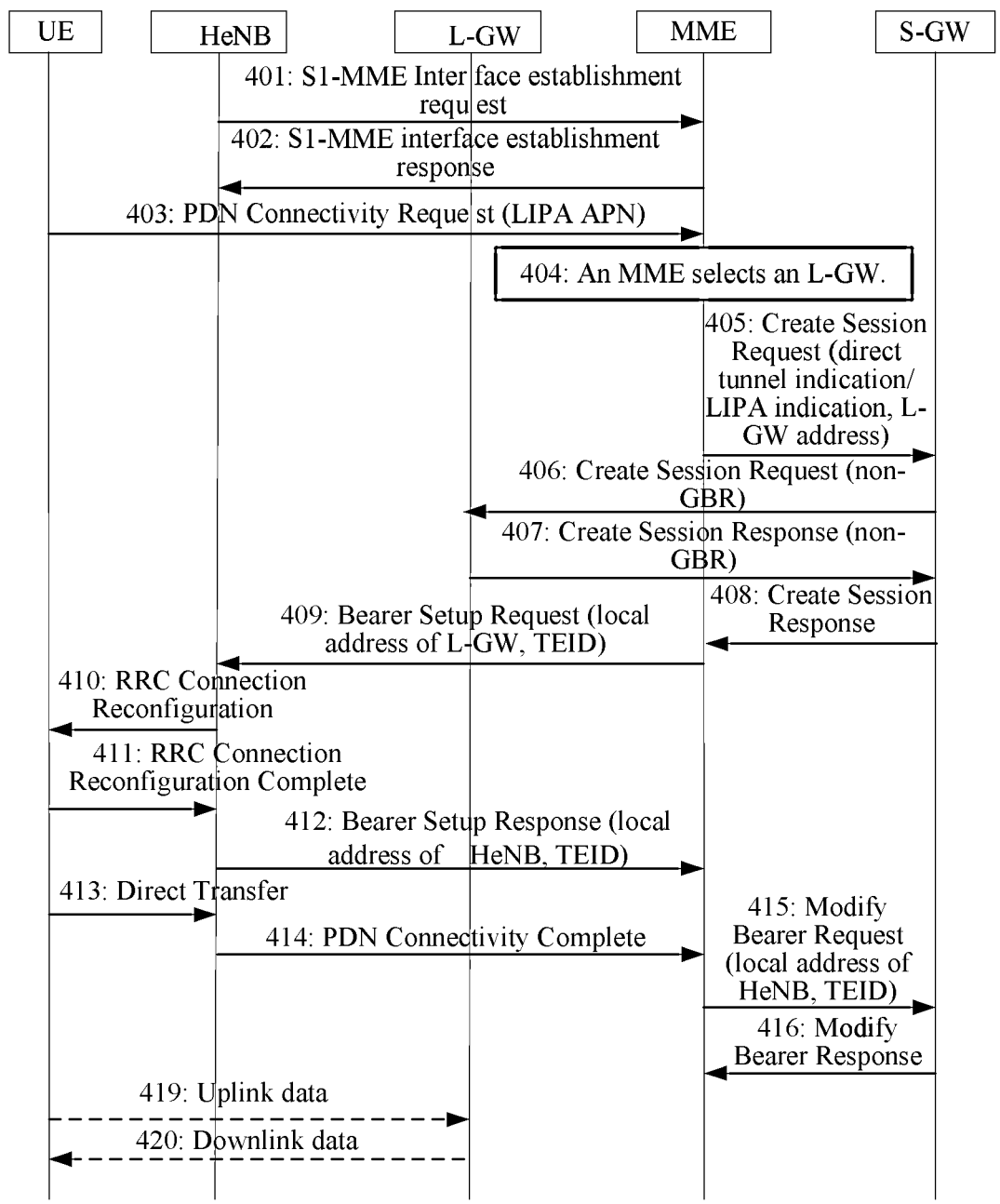
FIG. 17 is a schematic flowchart of Embodiment 4 of a method for establishing a connection between a local gateway and a home base station as shown in FIG. 5 according to the present invention.

FIG. 17 shows a flowchart of Embodiment 4 of a method for establishing a connection between a local gateway and a home base station in a local network as shown in FIG. 5 according to the present invention.

The method according to this embodiment includes:

Step 401: During an S1-MME interface establishment procedure between an HeNB and an MME, the HeNB sends an S1-MME setup request (S1 Setup Request) message to the MME, where the message carries an L-GW address and a priority list, and the priority list may be configured by a local network at least according to the position relationship between the L-GW and the HeNB or the load situation of the L-GW.

Step 402: After receiving the L-GW address and the priority list, the MME records the L-GW address and the priority list taking HeNB ID as the index, records the address and priority of the L-GW connected to the HeNB, and returns an S1-MME setup response (S1-MME Setup Response) message to the HeNB.

Step 403: The UE sends a PDN connectivity request to the HeNB, where the message carries an APN and the APN is an APN of an LIPA service allowed by subscriber subscription.

Step 404: After receiving the PDN connectivity request sent by the UE, the MME selects, based on recorded L-GW related information and the current load situation of the L-GW, an L-GW for establishing a PDN connection for the UE.

Step 405: The MME sends a create session request (Create Session Request) to the S-GW, where the message carries an L-GW address, used to instruct the S-GW to perform tunnel establishment, and meanwhile carries an LIPA instruction or a direct tunnel instruction, used to indicate that the tunnel is a non-GBR tunnel.

Step 406: The S-GW sends a create session request to the L-GW, where the carried bearer QoS parameter indicates that the bearer is a Non-GBR.

Step 407: The L-GW returns a create session response to the S-GW, where the carried bearer QoS parameter indicates that the bearer is a Non-GBR, and the create session response may also carry the L-GW local address and the TEID.

Step 408: The S-GW sends a create session response message to the MME, where the create session response does not carry user plane information, that is, an S1-MME bearer is not established, or the message may also carry the L-GW local address and the TEID.

Step 409: The MME sends a bearer setup request to the HeNB, where the bearer setup request carries the local network address of the L-GW, and a base station establishes a connection with the L-GW in subsequent steps.

Steps 410 to 411: Establish a bearer from the UE to the radio network using the HeNB, which is common knowledge for a person skilled in the art, and is not described herein again.

Step 412: The HeNB returns a bearer setup response to the MME, where the bearer setup response carries the local address of the HeNB and the TEID.

Step 413: The UE sends a direct transfer message to the base station.

Step 414: The base station sends a PDN connectivity complete message to the MME.

Step 415: The MME returns a modify bearer response to the S-GW, where the modify bearer response carries the local address of the HeNB and the TEID.

Step 416: The L-GW sends a modify bearer response to the S-GW.

Step 417: The UE sends uplink data to the HeNB.

Step 418: The HeNB sends downlink data to the UE.

As regards the newly proposed architecture 1 of a local home base station network according to the foregoing embodiment, after a UE sends a PDN connectivity request to an HeNB, an MME selects an L-GW by using L-GW related information received by the HeNB, and then informs the L-GW through the S-GW of establishing a PDN connection and a bearer tunnel between the L-GW and the HeNB, thereby providing a local IP access for the UE. In the embodiment of the present invention, a tunnel connection between the HeNB and the L-GW may further be established for the UE, so that data is routed from the L-GW to the HeNB rather than being transmitted indirectly through the core network of an operator.

Figure 20:
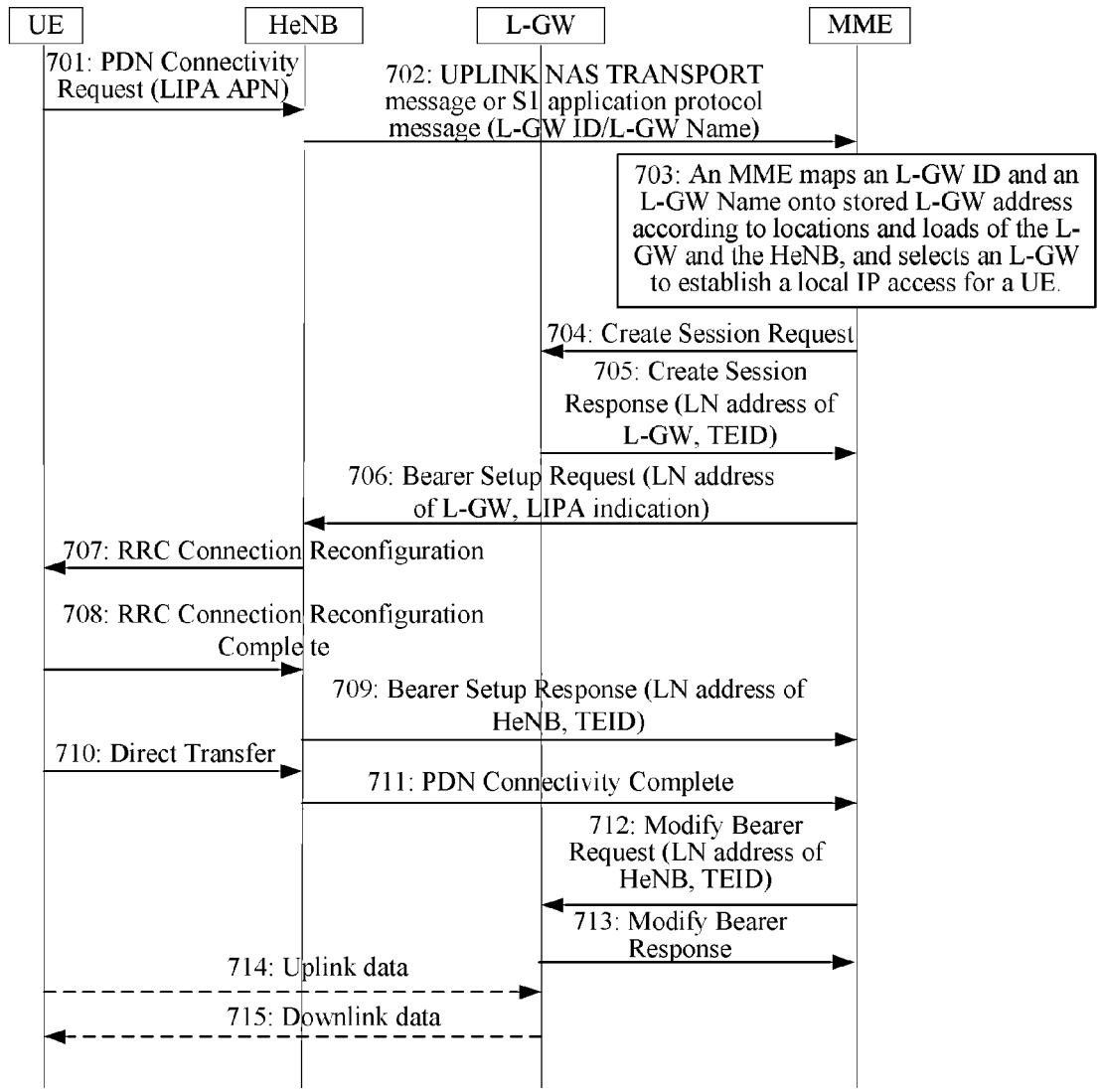
FIG. 20 is a schematic flowchart of Embodiment 3 of a method for establishing a connection between a local gateway and a home base station as shown in FIG. 6 according to the present invention.

The foregoing Embodiment 2, Embodiment 3, and Embodiment 4 describe in detail a method for establishing a connection between a local gateway and a home base station in a local home base station network (local network) as shown in FIG. 5, where in Embodiment 2, a mobility management network element selects an L-GW according to L-GW information sent by the HeNB in the first manner, and in Embodiment 3 and Embodiment 4, the mobility management network element selects an L-GW according to L-GW information sent by the HeNB in the third manner. As regards the third manner, that is, the implementation manner, that the home base station reports an L-GW ID and/or an L-GW name to the mobility management network element, and the mobility management network element selects a corresponding L-GW, is not described in detail, and reference may be made to Embodiment 3 of a method for establishing a connection between a local gateway and a home base station in a local network architecture 2 as shown in FIG. 20.

The third manner that an MME selects an L-GW is not detailed herein and will be illustrated in following embodiments.

Figure 18:
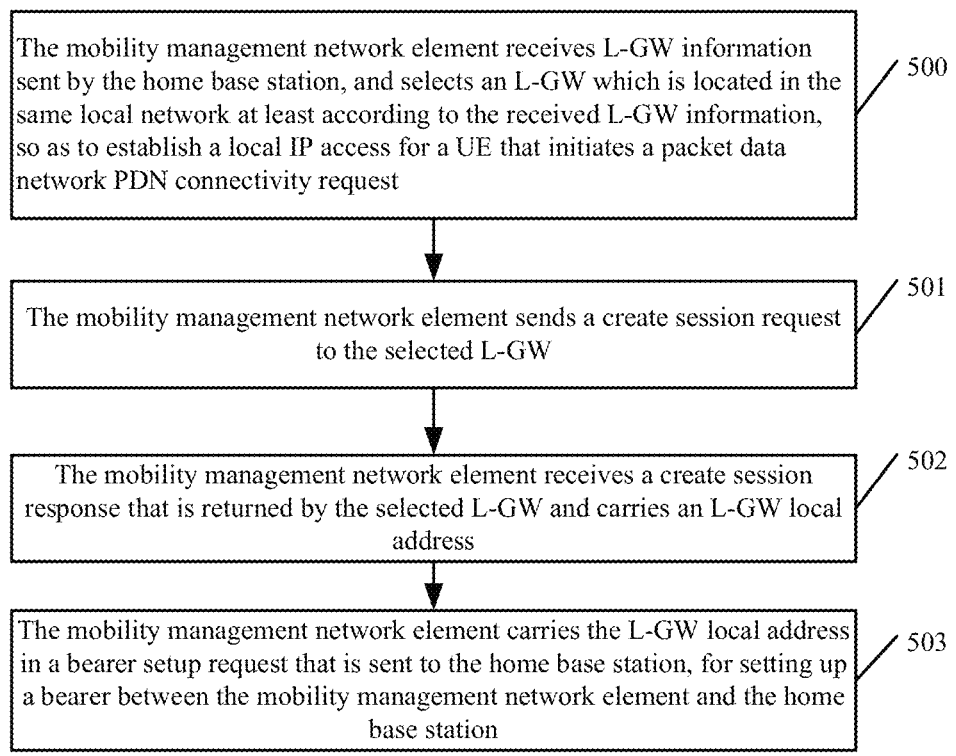
FIG. 18 is a schematic flowchart of Embodiment 1 of a method for establishing a connection between a local gateway and a home base station as shown in FIG. 6 according to the present invention.

Refer to FIG. 18, which is a schematic flowchart of Embodiment 1 of a method for establishing a connection between a local gateway and a home base station in a local network as shown in FIG. 6 according to the present invention.

This embodiment provides a method for establishing a connection between a local gateway and a home base station, where the local gateway L-GW is connected to a mobility management network element. The method includes:

Step 500: The mobility management network element receives L-GW information sent by the home base station, and selects an L-GW which is located in the same local network at least according to the received L-GW information, so as to establish a local IP access for a UE that initiates a packet data network PDN connectivity request.

Step 501: The mobility management network element sends a create session request to the selected L-GW.

Step 502: The mobility management network element receives a create session response that is returned by the selected L-GW and carries an L-GW local address.

Step 503: The mobility management network element carries the local address of the L-GW in a bearer setup request that is sent to the home base station, for setting up a bearer between the mobility management network element and the home base station.

It should be noted that the foregoing step 500: a mobility management network element receives L-GW information sent by a home base station and selects an L-GW which is located in the same local network as the home base station at least according to the received L-GW information, so as to establish a local IP access for a UE that initiates a packet data network PDN connectivity request, has three implementation manners in the specific implementation:

The first manner: the home base station carries its locally configured L-GW address or local network identity, or an L-GW address or a local network identity obtained during the interaction with the L-GW in an uplink non-access stratum NAS transport message or an S1 application protocol message to send to the mobility management network element, where the L-GW address is an L-GW local address and/or an L-GW core network address; and the mobility management unit selects an L-GW which is located in the same local network as the home base station and corresponds to the L-GW address or the local network identity at least according to the local network identity NAS transport message or the S1 application protocol message that is sent by the home base station, so as to establish a local IP access for the UE that initiates a packet data network PDN connectivity request.

The second manner: during the interface establishment procedure between the home base station and the mobility management network element, the home base station carries its locally configured L-GW address, or an L-GW address obtained during the interaction with the L-GW, or the L-GW address and an L-GW priority list in an interface establishment request message or a base station configuration update message to send to the mobility management network element where the L-GW address is an L-GW local address and/or an L-GW core network address; and after the home base station receives a PDN connectivity request from a UE and forwards the request to the mobility management network element, the mobility management network element selects an L-GW which is located in the same local network as the home base station at least according to the L-GW address or the L-GW address and the L-GW priority list carried in the received interface establishment request message or the base station configuration update message to establish a local IP access for the UE that initiates a packet data network PDN connectivity request.

The third manner: the home base station sends a local network identity and/or a local network name, which is carried in the uplink non-access stratum NAS transport message or the S1 application protocol message, to the mobility management network element; and after receiving the uplink non-access stratum NAS transport message or the S1 application protocol message which carries the local network identity (LHN ID, Local H(e)NB Network ID) and/or the local network name, the mobility management network element selects an L-GW which is located in the same local network as the home base station at least according to correspondence between the locally stored L-GW address and the local network identity and/or the local network name to establish a local IP access for the UE that initiates a packet data network PDN connectivity request.

The step 503: the mobility management network element carries the L-GW local address in a bearer setup request that is sent to the home base station, for setting up a bearer between the mobility management network element and the home base station, includes the following in a specific implementation process:

The mobility management network element sends a bearer setup request to the home base station, where the bearer setup request carries the local address of the L-GW and a local IP access instruction; and The home base station returns a bearer setup response to the mobility management network element, where the bearer setup response carries the local address of the home base station and/or a tunnel endpoint identifier TEID.

Figure 19:
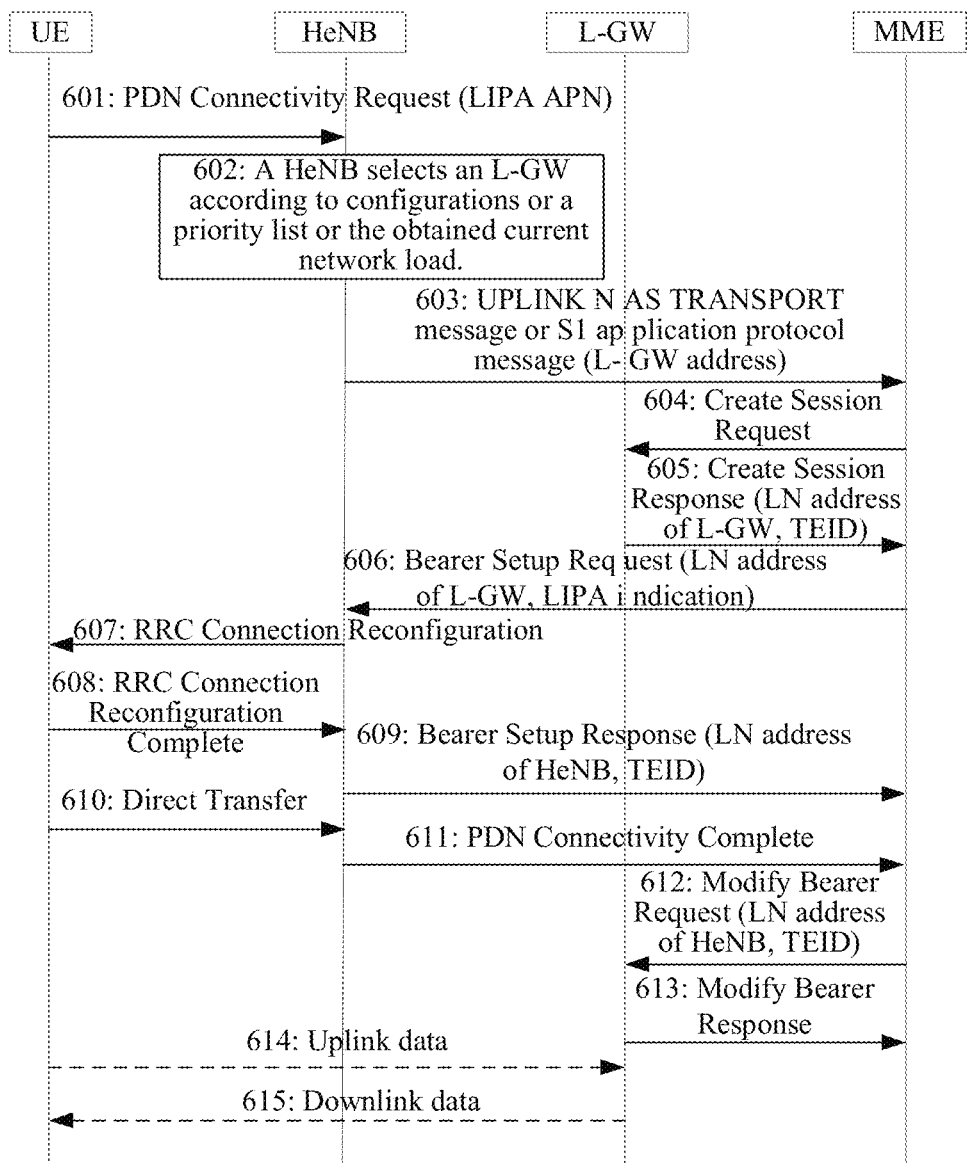
FIG. 19 is a schematic flowchart of Embodiment 2 of a method for establishing a connection between a local gateway and a home base station as shown in FIG. 6 according to the present invention.

Refer to FIG. 19, which is a schematic flowchart of Embodiment 2 of a method for establishing a connection between a local gateway and a home base station in a local network as shown in FIG. 6 according to the present invention.

In the method according to the embodiment of the present invention, a mobility management network element is specifically an MME and a home base station is specifically an HeNB. The method includes:

Step 601: A UE sends a PDN connectivity message to initiate a PDN establishment process, where the PDN connectivity message carries an APN and the APN is at least an APN of an LIPA service allowed by subscriber subscription.

Step 602: The H(e)NB selects an L-GW at least according to a locally configured L-GW address or L-GW priority list. It should be noted that local configuration may be configured by an operator or a customer, and is completed before the UE initiates the PDN connectivity request.

Step 603: The H(e)NB carries the address of the selected L-GW in an uplink non-access stratum NAS transport message or an S1 application protocol message that is sent to the MME, where the L-GW address is an L-GW local address and/or an L-GW core network address.

Step 604: The MME confirms that the APN provided by the UE is LIPA according to subscription data, and when the uplink non-access stratum NAS transport message or the S1 application protocol message sent to the MME by the HeNB includes an L-GW address, selects the L-GW corresponding to the L-GW address; and the MME sends a create session request to the L-GW, where the create session request carries an LIPA instruction, indicating that the bearer established by the L-GW is an LIPA bearer and the L-GW needs to return a local address.

Step 605: The L-GW returns a create session response message to the MME, where the message includes the L-GW local address (L-GW LN Address) and a tunnel endpoint identifier TEID in the downlink direction.

Step 606: The MME sends the bearer setup request message to the HeNB, where the message includes the L-GW local address and an LIPA instruction.

Step 607: The HeNB sends an RRC connection reconfiguration (RRC Connection Reconfiguration) message to the UE, and the message includes a PDN connectivity accept (PDN Connectivity Accept) message.

Step 608: The UE sends an RRC connection reconfiguration complete (RRC Connection Reconfiguration Complete) message to the HeNB.

Step 609: The HeNB sends an S1-AP bearer setup response (Bearer Setup Response) message to the MME, where the message includes an HeNB local address (HeNB LN Address) for establishing an S1-U connection and a TEID.

Step 610: The UE sends a direct transfer (Direct Transfer) message to the HeNB.

Step 611: The HeNB sends a PDN connectivity complete message to the MME.

Step 612: After receiving bearer setup response (Bearer Setup Response) and PDN connectivity complete (PDN Connectivity Complete) messages, the MME sends a modify bearer request (Modify Bearer Request) message to the S-GW, where the message includes the local network address (LN Address) of the base station and the TEID.

Step 613: The S-GW sends a modify bearer response (Modify Bearer Response) to the MME.

Step 614: The UE initiates uplink data transmission to the HeNB and the MME.

Step 615: The HeNB and the MME initiate uplink data transmission to the UE.

Refer to FIG. 20, which is a flowchart of Embodiment 3 of a method for establishing a connection between a local gateway and a home base station in a local network as shown in FIG. 6 according to the present invention.

In the method according to the embodiment, a mobility management network element is specifically an MME and a home base station is specifically an HeNB. The method includes:

Step 701: A UE sends a PDN connectivity message to initiate a PDN establishment process, where the message carries an APN and the APN is at least an APN of an LIPA service allowed by subscriber subscription.

Step 702: The H(e)NB sends an uplink non-access stratum NAS transport message or an S1 application protocol message which carries a local network identity (Local Network Identity) and/or an L-GW name (Local Network name) to the MME, assisting the MME to perform L-GW selection.

Step 703: The MME confirms that the APN provided by the UE is LIPA at least according to subscription data. The MME selects an L-GW at least according to the uplink non-access stratum NAS transport message or the S1 application protocol message that is sent by the HeNB to the MME and carries an L-GW ID and an L-GW name. The MME stores correspondence between the L-GW address and the L-GW name and/or the L-GW ID. The MME selects the L-GW at least according to the local network name and/or the local network ID and/or the current network conditions such as load balance, geographic position relationship.

Step 704: The MME sends a create session request to the selected L-GW, where the message carries an LIPA instruction, indicating that the bearer established by the L-GW is an LIPA bearer, and the L-GW needs to return its local address.

Step 705: The L-GW returns a create session response message to the MME, where the message includes the L-GW local address (L-GW LN Address) and a TEID in the downlink direction.

Step 706: The MME sends the bearer setup request message to the HeNB, where the message includes the L-GW local address and an LIPA instruction.

Step 707: The HeNB sends an RRC connection reconfiguration (RRC Connection Reconfiguration) message to the UE, and the RRC connection reconfiguration message includes a PDN connectivity accept (PDN Connectivity Accept) message.

Step 708: The UE sends an RRC connection reconfiguration complete (RRC Connection Reconfiguration Complete) message to the HeNB.

Step 709: The HeNB sends an S1-AP bearer setup response (Bearer Setup Response) message to the MME. The message includes an HeNB local address (HeNB LN Address) used for establishing an S1-U and the TEID.

Step 710: The UE sends a direct transfer (Direct Transfer) message to the HeNB.

Step 711: The HeNB sends a PDN connectivity complete message to the MME.

Step 712: After receiving bearer setup response (Bearer Setup Response) and PDN connectivity complete (PDN Connectivity Complete) messages, the MME sends a modify bearer request (Modify Bearer Request) message to the S-GW, where message includes an HeNB local address (HeNB LN Address) and the TEID.

Step 713: The S-GW sends a modify bearer response (Modify Bearer Response) to the MME.

Step 714: The UE initiates uplink data transmission to the HeNB and the MME.

Step 715: The HeNB and the MME initiate uplink data transmission to the UE.

Embodiment 2 and Embodiment 3 describe in detail a method for establishing a connection between a local gateway and a home base station in a local home base station network (local network) as shown in FIG. 6, where in Embodiment 2 and Embodiment 3, a mobility management network element selects an L-GW according to L-GW information sent by a home base station in the first manner and the third manner respectively. As regards the second manner, that is, during the interface establishment procedure between the home base station and the mobility management network element, the home base station reports L-GW information to the mobility management network element, and the mobility management network element selects a corresponding L-GW, no detailed description is provided. Reference may be made to Embodiment 3 of a method for establishing a connection between a local gateway and a home base station in a local network architecture 1 as shown in FIG. 16.

As regards the newly proposed architecture 2 of the local home base station network, an L-GW and an S-GW are not connected through a direct interface, after a UE sends a PDN connectivity request to the HeNB, the MME needs to directly select a corresponding L-GW to establish a PDN connection for the UE so as to provide a local IP access for the UE. Therefore, the MME receives L-GW information sent by the HeNB, selects an L-GW and informs the L-GW of establishing a PDN connection and a bearer tunnel between the L-GW and the HeNB, thereby providing a local IP access for the UE. In the embodiment of the present invention, a tunnel connection between the home base station and the L-GW may further be established for the UE, so that data is routed from the L-GW to the home base station rather than being transmitted indirectly through the core network of an operator.

A person of ordinary skill in the art may understand that all or a part of the processes of the methods in the embodiments may be implemented by a computer program instructing relevant hardware. The program may be stored in a computer readable storage medium. When the program is run, the processes of the methods in the embodiments are performed. The storage medium may be a magnetic disk, an optical disk, a read-only memory (Read-Only Memory, ROM), or a random access memory (Read-Only Memory, RAM).

The above is merely exemplary implementation manners according to the present invention. It should be noted by a person of ordinary skill in the art that various improvements and modifications may be further made without departing from the principles of the present invention, which should be construed as falling within the scope of the present invention.

What is claimed is:

1. A method for establishing a connection between a local gateway (L-GW) and a home base station, wherein the L-GW is connected to a serving gateway (S-GW), and the S-GW is connected to a mobility management network element, comprising:
   receiving, by the mobility management network element, L-GW information sent by the home base station, and selecting the L-GW which is located in a same local network as the home base station according to at least the received L-GW information, so as to establish a local Internet Protocol (IP) access for a user equipment (UE) that initiates a packet data network (PDN) connectivity request;
   sending, by the mobility management network element, a create session request to the selected L-GW through the S-GW, and receiving, in response to the create session request, a create session response returned by the selected L-GW; and
   carrying, by the mobility management network element, a local address of the selected L-GW in a bearer setup request that is sent to the home base station, and establishing, by the home base station, the connection between the home base station and the selected L-GW by using the received local address of the selected L-GW.

2. The method according to claim 1, wherein the receiving the L-GW information and selecting the L-GW comprises:
   carrying, by the home base station, a locally configured L-GW address configured by the base station, a local network identity, an L-GW address, a local network identity obtained during the interaction with the L-GW in an uplink non-access stratum (NAS) transport message, or an S1 application protocol message to send to the mobility management network element, wherein the L-GW address is at least one of an L-GW local address and an L-GW core network address; and
   selecting, as the selected L-GW, by the mobility management network element, an L-GW which is located in the same local network as the home base station and corresponds to the L-GW address or the local network identity according to at least the uplink NAS transport message or the S1 application protocol message sent by the home base station to establish a local IP access for the UE that initiates the PDN connectivity request.

3. The method according to claim 1, wherein the receiving the L-GW information and selecting the L-GW comprises:
   carrying, by the home base station, a locally configured L-GW address configured by the home base station, an L-GW address obtained during the interaction with the L-GW, or the L-GW address and an L-GW priority list in an interface establishment request message or a base station configuration update message to send to the mobility management network element during an interface establishment procedure between the home base station and the mobility management network element, wherein the L-GW address is at least one of an L-GW local address and an L-GW core network address; and
   selecting, as the selected L-GW, by the mobility management network element after the home base station receives a PDN connectivity request from a UE and forwards the request to the mobility management network element, an L-GW which is located in the same local network as the home base station according to at least one of the L-GW address, the L-GW priority list carried in the received interface establishment request message, and the base station configuration update message to establish a local IP access for the UE that initiates the PDN connectivity request.

4. The method according to claim 1, wherein the receiving the L-GW information comprises:
   carrying, by the home base station, at least one of a local network identity, a local network name in an uplink non-access stratum NAS transport message, and an S1 application protocol message to send to the mobility management network element; and
   selecting, as the selected L-GW, by the mobility management network element after receiving the uplink NAS transport message or the S1 application protocol message which carries at least one of the local network identity and the local network name, an L-GW which is located in the same local network as the home base station at least according to correspondence between an L-GW address and at least one of the local network identity and the local network name to establish the local IP access for the UE that initiates the PDN connectivity request.

5. The method according to claim 1, wherein the sending the create session request and receiving the create session response comprises:
   sending, by the mobility management network element, the create session request to the S-GW, wherein the create session request carries at least one of a L-GW core network address of the selected L-GW, a local IP access instruction, and a direct tunnel instruction, the L-GW core network address is used to instruct a tunnel establishment between the S-GW and the L-GW corresponding to the L-GW core network address, and the local IP access instruction or the direct tunnel instruction is used to instruct the S-GW to establish a non-guaranteed bit rate non-GBR tunnel;
   sending, by the S-GW, the create session request to the L-GW corresponding to the L-GW core network address, wherein the create session request carries a QoS parameter for establishing the non-GBR tunnel; and
   returning, by the L-GW, the create session response to the mobility management network element through the S-GW, wherein the create session response carries the QoS parameter for establishing the non-GBR tunnel.

6. The method according to claim 1, wherein the sending the create session request and receiving the create session response comprises:
   sending, by the mobility management network element, a first create session request to the S-GW, wherein the create session request carries at least one of a L-GW core network address of the L-GW selected by the mobility management network element, the local IP access instruction, and the direct tunnel instruction, the L-GW core network address is used to instruct a tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

sending, by the S-GW, a second create session request to the L-GW corresponding to the L-GW core network address, wherein the create session request carries a QoS parameter for establishing the non-GBR tunnel;

returning, by the L-GW, a first create session response to the mobility management network element through the S-GW, wherein the create session response carries the QoS parameter for establishing the non-GBR tunnel; and returning, by the S-GW, a second create session response to the mobility management network element, wherein the create session response carries control plane information.

7. The method according to claim 1, wherein the carrying the local address of the selected L-GW and establishing the connection comprises:

sending, by the home base station, the create session request to the L-GW corresponding to the L-GW local address after the receiving the bearer setup request sent by the mobility management network element, wherein the create session request carries at least one of a local address of the home base station and a tunnel endpoint identifier (TEID); and receiving, by the home base station, the create session response sent by the L-GW, wherein the create session response carries at least one of the local address of the L-GW and the TEID.

8. The method according to claim 1, wherein the carrying the local address of the selected L-GW and establishing the connection comprises:

returning, by the home base station, at least one of a local address of the home base station and a tunnel endpoint identifier (TEID) to the mobility management network element after the home base station receives the bearer setup request sent by the mobility management network element; and sending, by the mobility management network element, at least one of the local address of the home base station and the TEID to the selected L-GW after the mobility management network element receives the at least one of the local address of the home base station and the TEID returned by the home base station.

9. A method for establishing a connection between a local gateway (L-GW) and a home base station, wherein the L-GW is connected to a mobility management network element, comprising:

receiving, by the mobility management network element, L-GW information sent by the home base station, and selecting an L-GW which is located in a same local network as the home base station according to at least the received L-GW information, so as to establish a local Internet Protocol (IP) access for a user equipment (UE) that initiates a packet data network (PDN) connectivity request;

sending, by the mobility management network element, a create session request to the selected L-GW, and receiving, in response to the create session request, a create session response carrying a local address of the selected L-GW and returned by the selected L-GW; and carrying, by the mobility management network element, the local address of the selected L-GW in a bearer setup request that is sent to the home base station, for setting up a bearer between the mobility management network element and the home base station.

10. The method according to claim 9, wherein the receiving the L-GW information and selecting the L-GW comprises:

carrying, by the home base station, a locally configured L-GW address configured by the home base station, a local network identity, an L-GW address or a local network identity obtained during the interaction with the L-GW in an uplink non-access stratum (NAS) transport message, or an S1 application protocol message to send to the mobility management network element, wherein the L-GW address is at least one of an L-GW local address and an L-GW core network address; and selecting, as the selected L-GW, by the mobility management network element, the L-GW which is located in the same local network as the home base station and corresponds to the L-GW address or the local network identity according to at least the uplink NAS transport message or the S1 application protocol message sent by the home base station to establish a local IP access for the UE that initiates a PDN connectivity request.

11. The method according to claim 9, wherein the receiving the L-GW information and selecting the L-GW comprises:

carrying, by the home base station, a locally configured L-GW address configured by the home base station, an L-GW address obtained during the interaction with the L-GW, or an L-GW address and an L-GW priority list in an interface establishment request message or a base station configuration update message to send to the mobility management network element during an interface establishment procedure between the home base station and the mobility management network element; and selecting, as the selected L-GW, by the mobility management network element after the home base station receives a PDN connectivity request from a UE and forwards the request to the mobility management network element, an L-GW which is located in the same local network as the home base station according to at least one of the L-GW address, the L-GW priority list carried in the received interface establishment request message, and the base station configuration update message to establish a local IP access for the UE that initiates a packet data network PDN connectivity request.

12. The method according to claim 9, wherein the receiving the L-GW information and selecting the L-GW comprises:

carrying, by the home base station, at least one of a local network identity and a local network name in an uplink non-access stratum (NAS) transport message or an S1 application protocol message to send to the mobility management network element; and selecting, as the selected L-GW, by the mobility management network element after receiving the uplink NAS transport message or the S1 application protocol message which carries the local network identity and/or the local network name, the L-GW which is located in the same local network as the home base station according to at least a correspondence between a locally stored L-GW address and at least one of the local network identity and the local network name to establish a local IP access for the UE that initiates a packet data network PDN connectivity request.

13. The method according to claim 9, wherein the carrying the local address of the L-GW comprises:

sending, by the mobility management network element, a bearer setup request to the home base station, wherein the bearer setup request carries the local address of the L-GW and a local IP access instruction; and returning, by the home base station, a bearer setup response to the mobility management network element, wherein the bearer setup response message carries at least one of the local address of the home base station and a tunnel endpoint identifier (TEID).

14. A local network, comprising:
a local gateway (L-GW);
a home base station;
a mobility management network element; and
a serving gateway (S-GW), wherein the L-GW is connected to the S-GW, the S-GW is connected to the mobility management network element, the L-GW is connected to the home base station, and the home base station is connected to the mobility management network element, wherein:

the mobility management network element is configured to receive L-GW information sent by the home base station, select an L-GW which is located in a same local network as the home base station at least according to the received L-GW information, so as to establish a local IP access for a user equipment (UE) that initiates a packet data network (PDN) connectivity request, and sends a create session request to the selected L-GW through the S-GW;

the S-GW is configured to return a create session response to the mobility management network element in response to the create session request;

the mobility management network element is further configured to carry a local address of the selected L-GW in a bearer setup request that is sent to the home base station; and the home base station is configured to establish a connection between the home base station and the L-GW by using the received local address of the L-GW.

15. The network according to claim 14, wherein the home base station comprises:
at least one hardware processor configured to implement:
an L-GW information sending module, configured to carry a locally configured L-GW address configured by the home base station, a local network identity, an L-GW address or a local network identity obtained during interaction with the L-GW in an uplink non-access stratum (NAS) transport message or an S1 application protocol message to send to the mobility management network element; or carry the locally configured L-GW address the L-GW address obtained during the interaction with the L-GW, or the L-GW address and an L-GW priority list in an interface establishment request message or a base station configuration update message to send to the mobility management network element; or carry at least one of a plurality of local network identities and local network names in the uplink NAS transport message or an S1 application protocol message to send to the mobility management network element;
a bearer setup request receiving module, configured to receive a bearer setup request sent by the mobility management network element, wherein the bearer setup request carries an L-GW local address;
a create session request sending module, configured to send the create session request to the L-GW corresponding to the L-GW local address directly or through the mobility management network element, wherein the create session request carries at least one of a local address of the home base station and a tunnel endpoint identifier (TEID);
a create session response receiving module, configured to receive a create session response returned by the L-GW directly or through the mobility management network element, wherein the create session response carries the L-GW local address and/or the TEID; and
a bearer setup response sending module, configured to send a bearer setup response to the mobility management network element.

16. The network according to claim 15, wherein the mobility management network element comprises:
at least one hardware processor configured to implement:
an L-GW information receiving module, configured to receive the uplink NAS transport message or the S1 application protocol message that is sent by the L-GW information sending module of the home base station and carries the L-GW address or the local network identity, or during an interface establishment procedure between the mobility management network element and the home base station, receive an interface establishment request or a base station configuration update message that is sent by the L-GW information sending module of the home base station and carries the locally configured L-GW address, the L-GW address obtained during the interaction with the L-GW, or the L-GW address and an L-GW priority list, or receive the uplink NAS transport message or the S1 application protocol message that is sent by the L-GW information sending module of the home base station and carries at least one of the local network identity and the local network name;
an L-GW selecting module, configured to select the L-GW which is located in the same local network as the home base station and corresponds to the L-GW address or the local network identity to establish a local IP access for the UE that initiates a PDN connectivity request, or select the L-GW which is located in the same local network as the home base station according to at least the L-GW address or the L-GW address, and the L-GW priority list carried in the interface establishment request message or the base station configuration update message received by the L-GW information receiving module to establish the local IP access for a UE that initiates a PDN connectivity request, or after the L-GW information receiving module receives at least one of the local network identity and the local network name carried in the uplink NAS transport message or the S1 application protocol message, select the L-GW which is located in the same local network as the home base station according to at least a correspondence between a locally stored L-GW address and at least one of the local network identity and the local network name to establish a local IP access for a UE that initiates a PDN connectivity request;
a create session request sending module, configured to send the create session request to the S-GW, wherein the create session request carries an L-GW core network address of the selected L-GW and a local IP access instruction or a direct tunnel instruction, the L-GW core network address is used to instruct to establish a tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

a create session response receiving module, configured to receive the create session response returned by the S-GW, wherein the create session response carries a QoS parameter for establishing the non-GBR tunnel or user plane information;

a bearer setup request sending module, configured to: after the create session response receiving module receives the create session response returned by the S-GW, carry the local address of the L-GW in a bearer setup request that is sent to the home base station; and a bearer setup response receiving module, configured to receive a bearer setup response returned by the home base station, in response to the bearer setup request.

17. The network according to claim 16, wherein the S-GW comprises:

at least one hardware processor configured to implement:

a create session request receiving module, configured to receive the create session request sent by the mobility management network element, wherein the create session request carries the L-GW core network address of the selected L-GW and the local IP access instruction or the direct tunnel instruction, the L-GW core network address is used to instruct the tunnel establishment between the S-GW and the L-GW corresponding to the L-GW core network address, and the local IP access instruction or the direct tunnel instruction is used to instruct the S-GW to establish a non-guaranteed bit rate non-GBR tunnel;

a create session request sending module, configured to send the create session request to the L-GW corresponding to the L-GW core network address, wherein the create session request carries at least one of the local IP access instruction and the QoS parameter for establishing the non-GBR tunnel;

a create session response receiving module, configured to receive the create session response returned by the L-GW, wherein the create session response carries the QoS parameter for establishing the non-GBR tunnel or carries control plane information; and a create session response sending module, configured to send the create session response to the mobility management network element, wherein the create session response carries the QoS parameter for establishing the non-GBR tunnel or carries control plane information.

18. The network according to claim 17, wherein the L-GW comprises:

at least one hardware processor configured to implement:

a create session request receiving module, configured to receive the create session request sent by the create session request sending module of the S-GW, wherein the create session request carries at least one of the local IP access instruction and the QoS parameter for establishing the non-GBR tunnel; and a create session response sending module, configured to return the create session response to the S-GW, wherein the create session response carries the QoS parameter for establishing the non-GBR tunnel or carries control plane information.

19. A local network, comprising:
a local gateway (L-GW);
a home base station; and
a mobility management network element, wherein the L-GW is connected to the mobility management network element and the L-GW is connected to the home base station, wherein, the home base station is configured to send L-GW information to the mobility management network element;

the mobility management network element is configured to receive the L-GW information sent by the home base station, and select the L-GW which is located in a same local network as the home base station at least according to the received L-GW information, so as to establish a local Internet Protocol (IP) access for a user equipment (UE) that initiates a packet data network (PDN) connectivity request;

the mobility management network element is further configured to send a create session request to the selected L-GW;

the selected L-GW is configured to send a create session response to the mobility management network element, wherein the create session response carries a local address of the L-GW; and the mobility management network element is further configured to: after receiving the create session response returned from the selected L-GW, carry the local address of the L-GW in a bearer setup request that is sent to the home base station, for setting up a bearer between the mobility management network element and the home base station.

20. The network according to claim 19, wherein the home base station comprises:

at least one hardware processor configured to implement:

an L-GW information sending module, configured to carry a locally configured L-GW address configured by the home base station, a local network identity, an L-GW address or a local network identity obtained during interaction with the L-GW in an uplink non-access stratum (NAS) transport message or an S1 application protocol message to send to the mobility management network element; or carry the locally configured L-GW address, the L-GW address obtained during the interaction with the L-GW, the L-GW address and an L-GW priority list in an interface establishment request message or a base station configuration update message to send to the mobility management network element; or carry at least one of a plurality of local network identities and local network names in an uplink NAS transport message or an S1 application protocol message to send to the mobility management network element;

a bearer setup request receiving module, configured to receive a bearer setup request sent by the mobility management network element to the home base station, wherein the bearer setup request carries the L-GW local address and a local IP access instruction; and a bearer setup response sending module, configured to send a bearer setup response to the mobility management network element, wherein the bearer setup response carries the local address of at least one of the home base station and a tunnel endpoint identifier (TEID).

21. The network according to claim 20, wherein the mobility management network element comprises:

at least one hardware processor configured to implement:

an L-GW information receiving module, configured to receive the uplink NAS transport message or the S1 application protocol message that is sent by the L-GW information sending module of the home base station and carries the L-GW address, the local network identity, or during an interface establishment procedure between the mobility management network element and the home base station, receive the interface establishment request message or the base station configuration update message that is sent by the L-GW information sending module of the home base station and carries the locally configured L-GW address, the L-GW address obtained during the interaction with the L-GW, or the L-GW address and an L-GW priority list, or receive the uplink NAS transport message or the S1 application protocol message that is sent by the L-GW information sending module of the home base station and carries at least one of the local network identity and a local network name;

an L-GW selecting module, configured to select an L-GW corresponding to the L-GW address or the local network identity according to at least the L-GW address or the local network identity carried in the interface establishment request message or the base station configuration update message received by the L-GW information receiving module to establish the local IP access for the UE that initiates the PDN connectivity request, or select an L-GW which is located in the same local network as the home base station at least according to the L-GW address, or the L-GW address and the L-GW priority list carried in the interface establishment request message or the base station configuration update message received by the L-GW information receiving module to establish a local IP access for the UE that initiates a packet data network PDN connectivity request, or after the L-GW information receiving module receives at least one of the local network identity and the local network name carried in the uplink NAS transport message or the S1 application protocol message, select an L-GW which is located in the same local network as the home base station at least according to correspondence between the locally stored L-GW address and at least one of the local network identity and the local network name to establish the local IP access for the UE that initiates the PDN connectivity request;

a create session request sending module, configured to send the create session request to the L-GW selected by the L-GW selecting module;

a create session response receiving module, configured to receive the create session response returned by the selected L-GW, wherein the create session response carries at least one of the local address of the L-GW and the TEID;

a bearer setup request sending module, configured to send a bearer setup request to the home base station after the create session response receiving module receives the create session response returned by the selected L-GW, wherein the bearer setup request carries the local address of the L-GW and the local IP access instruction; and a bearer setup response receiving module, configured to receive a bearer setup response returned by the home base station, wherein the bearer setup response carries at least one of the local address of the home base station and the TEID.

22. The network according to claim 21, wherein the L-GW comprises:

at least one hardware processor configured to implement:
a create session request receiving module, configured to receive the create session request sent by a create session request sending module of the mobility management network element; and a create session response sending module, configured to return the create session response to the mobility management network element, wherein the create session response carries the local address of the L-GW and/or the TEID.

* * * * *